(12) United States Patent
Sethi et al.

(10) Patent No.: US 12,732,232 B2
(45) Date of Patent: Sep. 8, 2026

(54) WIRELESS COMMUNICATIONS USING NON-RECIPROCAL RELAYS AND SPATIALLY-FED REPEATERS

(71) Applicant: Latys Intelligence Inc., Montreal (CA)

(72) Inventors: Gursimran Singh Sethi, Montreal (CA); Mahbubeh Esmaeili, Montreal (CA); Yousef Vahabzadeh Jamairan, Montreal (CA); Paul Anthony Tornatta, Jr., Montreal (CA); Dennis Yost, Montreal (CA)

(73) Assignee: Latys Intelligence Inc., Montreal (CA)

( * ) Notice: Subject to any disclaimer, the term of this patent is extended or adjusted under 35 U.S.C. 154(b) by 0 days.

(21) Appl. No.: 18/681,385

(22) PCT Filed: Aug. 9, 2022

(86) PCT No.: PCT/IB2022/057411

§ 371 (c)(1),
(2) Date: Feb. 5, 2024

(87) PCT Pub. No.: WO2023/017412

PCT Pub. Date: Feb. 16, 2023

(65) Prior Publication Data

US 2024/0313829 A1 Sep. 19, 2024

Related U.S. Application Data

(60) Provisional application No. 63/230,969, filed on Aug. 9, 2021.

(51) Int. Cl.

| | |
|---|---|
| ***H04B 7/04*** | (2017.01) |
| ***H04B 7/0408*** | (2017.01) |
| ***H04B 7/155*** | (2006.01) |

(52) U.S. Cl.
CPC ....... *H04B 7/04013* (2023.05); *H04B 7/0408* (2013.01); *H04B 7/15528* (2013.01)

(58) Field of Classification Search
CPC .............. H04B 7/04013; H04B 7/0408; H04B 7/15528; H01Q 15/0086; H01Q 3/46; H01Q 15/0033
(Continued)

(56) References Cited

U.S. PATENT DOCUMENTS

| | | | | |
|---|---|---|---|---|
| 11,251,847 B2 * | 2/2022 | Wang | .................. | H04B 7/0617 |
| 2017/0077613 A1 * | 3/2017 | Banu | .................... | H04B 17/364 |

(Continued)

FOREIGN PATENT DOCUMENTS

| | | |
|---|---|---|
| CN | 110380763 | 10/2019 |
| JP | 2016092715 A | 5/2016 |

OTHER PUBLICATIONS

Extended European Search Report mailed May 27, 2025 issued in App No. EP22855617 (pp. 1-9).

(Continued)

*Primary Examiner* — Emmanuel Bayard
(74) *Attorney, Agent, or Firm* — Blueshift IP; Robert Plotkin

(57) ABSTRACT

A method of using a non-reciprocal spatially-fed antenna for wireless communication includes: receiving, by the non-reciprocal spatially-fed antenna, a first wireless signal from a base station in a first beam direction; transmitting, by the non-reciprocal spatially-fed antenna, the first wireless signal in a second beam direction; receiving, by the non-reciprocal spatially-fed antenna, a second wireless signal in a third beam direction; and transmitting, by the non-reciprocal spatially-fed antenna, the second wireless signal in a fourth beam direction toward the base station. A non-reciprocal surface and an antenna array are also described.

19 Claims, 19 Drawing Sheets

(58) Field of Classification Search
USPC .................................. 375/219, 267, 299, 347
See application file for complete search history.

(56) References Cited

U.S. PATENT DOCUMENTS

| | | | | |
|---|---|---|---|---|
| 2019/0044568 | A1* | 2/2019 | Yamaguchi | H04B 7/0691 |
| 2020/0028247 | A1 | 1/2020 | Shapoury | |
| 2020/0220628 | A1* | 7/2020 | Vella-Coleiro | G01R 29/105 |
| 2021/0175635 | A1* | 6/2021 | Brobston | H01Q 1/523 |
| 2022/0077919 | A1* | 3/2022 | Li | H04B 7/04013 |
| 2022/0149900 | A1* | 5/2022 | Llorens Del Rio | H04B 17/21 |
| 2022/0232422 | A1* | 7/2022 | Dai | H04W 72/21 |
| 2022/0322321 | A1* | 10/2022 | Dai | H04W 72/51 |
| 2024/0072452 | A1* | 2/2024 | Taravati | H01Q 3/44 |

OTHER PUBLICATIONS

Reza Karimian et al: "Nonreciprocal-Beam Phased-Array Antennas", Apr. 11, 2021, XP081923780, 10 pages.
Sajjad Taravati et al: "Intelligent-Metasurface-Assisted Full-Duplex Wireless Communications", May 19, 2021, XP081966951, 7 pages.
Sajjad Taravati et al., Full-Duplex Nonreciprocal-Beam-Steering Metasurfaces Comprising Time-Modulated Twin Meta-Atoms, Nov. 11, 2019, 34 pages.
International Search Report issued in App. No. PCT/IB2022/057411, dated Oct. 27, 2022, 4 pages.
Japanese Office Action (including English translation) issued in App. No. JP2024508434, dated Jul. 24, 2026 (pp. 1-9).
Taravati, Sajjad, and George V. Eleftheriades. "Intelligent-metasurface-assisted full-duplex wireless communications." arXiv preprint arXiv:2105.09436 (2021).

* cited by examiner

Mag/Phase Adjust
Mag/Phase Detection
Mag/Phase Adjust
Mag/Phase Detection
Processor 1134
1132
1130
1112
1126
1122
1132
1120
1130
1126
1124

1858a
1858b
1858c
1810
1856

WIRELESS COMMUNICATIONS USING NON-RECIPROCAL RELAYS AND SPATIALLY-FED REPEATERS

CROSS REFERENCE

This application claims priority to U.S. Provisional Patent Application Ser. No. 63/230,969, entitled "Full Duplex Transmissive and Reflective Relay System based on Spatially Fed Repeaters", filed Aug. 9, 2021, the contents of which are incorporated by reference herein in their entirety.

TECHNICAL FIELD

The invention relates to wireless communications, and in particular to wireless communications using spatially fed repeaters.

BACKGROUND OF THE ART

As wireless communication technologies continue to be developed, the demand for wireless services continues to increase. There is always a desire for additional services, as well as improved capacity and territorial coverage for existing services.

Many improvements relate to the operations of the network-side access node, which may be a Wi-Fi access point (AP), a wireless base station (BS) such as a fourth-generation (4G) evolved node-B (eNB), a fifth-generation gNodeB (gNB). Other improvements relate to the operations of the device accessing the network, which may be a Wi-Fi station (STA), a wireless user equipment (UE) such as a smartphone or tablet, an Internet-of-Things (IoT) device, or any other device capable of wirelessly accessing the network.

One elusive goal of cellular and Wi-Fi communication networks is full-duplex (FD) communication, which refers to a single device such as a base station transmitting and receiving signals using the same frequency at the same time. If achieved, FD communication has the potential to double the data capacity of a network, compared to current technologies such as time-division duplexing (TDD) or frequency-division duplexing (FDD) (sometimes collectively called "half-duplex" or "HD"). FD may also reduce latency compared to TDD, because a device can't transmit data during a designated receive interval.

However, technical issues remain for implementing FD communication, such as interference between a signal being transmitted and a signal being received by the same device. Because an FD device transmits and receives at the same frequency, it can't use frequency-selective hardware to distinguish the two signals. In addition, because the received signal has been attenuated by travelling over the air, a very small interference component from the transmitted signal may be enough to overwhelm the received signal and make it unintelligible.

Therefore, there is a desire for improved wireless communications, and in particular for improved full duplex wireless communications.

SUMMARY

It is an object of the present invention to provide a system and method for wireless communication that ameliorates at least one drawback of the prior art.

It is an object of the present invention to provide a system and method for full-duplex wireless communication.

It is an object of the present invention to provide a system and method for enabling full-duplex wireless communication using half-duplex wireless devices.

It is an object of the present invention to provide an improved TDMA or FDMA system by the use of non-reciprocal arrays.

According to a first broad aspect, a method of using a non-reciprocal spatially-fed antenna for wireless communication includes: receiving, by the non-reciprocal spatially-fed antenna, a first wireless signal from a base station in a first beam direction; transmitting, by the non-reciprocal spatially-fed antenna, the first wireless signal in a second beam direction; receiving, by the non-reciprocal spatially-fed antenna, a second wireless signal in a third beam direction; and transmitting, by the non-reciprocal spatially-fed antenna, the second wireless signal in a fourth beam direction toward the base station.

Optionally, in any of the previous aspects, the second beam direction is toward a first reflecting surface.

Optionally, in any of the previous aspects, the reflecting surface is a non-reciprocal reflecting surface.

Optionally, in any of the previous aspects, the third beam direction is toward a second reflecting surface.

Optionally, in any of the previous aspects, the second reflecting surface is a non-reciprocal reflecting surface.

Optionally, in any of the previous aspects, the first and second wireless signals at least partially overlap in time; and wherein the first and second wireless signals at least partially overlap in frequency.

Optionally, in any of the previous aspects, receiving the first wireless signal from the base station comprises receiving the first wireless signal from at least one first antenna of the base station; and transmitting the second wireless signal toward the base station comprises transmitting the second wireless signal to at least one second antenna of the base station. The at least one first antenna is spatially separated from the at least one second antenna.

Optionally, in any of the previous aspects, the first beam direction and the fourth beam direction are substantially nonparallel.

Optionally, in any of the previous aspects, the non-reciprocal spatially-fed antenna is a beam steerable metasurface.

According to a second broad aspect, a non-reciprocal surface has a plurality of antenna elements, each antenna element having at lease one tunable phase shifter for shifting a phase of a signal transmitted or received by the antenna element. The non-reciprocal surface is configured to: receive a first wireless signal from a base station in a first beam direction; transmit the first wireless signal in a second beam direction; receive a second wireless signal in a third beam direction; and transmit the second wireless signal in a fourth beam direction toward the base station.

Optionally, in any of the previous aspects, the second beam direction is toward a first reflecting surface.

Optionally, in any of the previous aspects, the first reflecting surface is a first non-reciprocal reflecting surface.

Optionally, in any of the previous aspects, the third beam direction is toward a second reflecting surface.

Optionally, in any of the previous aspects, the second reflecting surface is a second non-reciprocal reflecting surface.

Optionally, in any of the previous aspects, the first and second wireless signals at least partially overlap in time; and wherein the first and second wireless signals at least partially overlap in frequency.

Optionally, in any of the previous aspects, receiving the first wireless signal from the base station comprises receiving the first wireless signal from at least one first antenna of the base station; and transmitting the second wireless signal toward the base station comprises transmitting the second wireless signal to at least one second antenna of the base station. The at least one first antenna is spatially separated from the at least one second antenna.

Optionally, in any of the previous aspects, the first beam direction and the fourth beam direction are substantially nonparallel.

Optionally, in any of the previous aspects, the nonreciprocal surface is a beam steerable metasurface.

According to a third broad aspect, an antenna array for transmitting and receiving wireless signals includes: an input/output (I/O) port; a plurality of antenna elements arranged in a two-dimensional grid; each antenna element of the plurality of antenna elements being connected to the I/O port via a respective magnitude and phase adjustment (MPA) module; each MPA module having a transmit path and a receive path, the MPA module being configured to only permit transmissions from the I/O port to the antenna element via the transmit path, the MPA module being configured to only permit transmissions from the antenna element to the I/O port via the receive path; the transmit path including a first amplifier and a first phase shifter; and the receive path including a second amplifier and a second phase shifter.

Optionally, in any of the previous aspects, each MPA module comprises: a first circulator to only permit transmissions from the I/O port to the antenna element via the transmit path, and a second circulator to only permit transmissions from the antenna element to the I/O port via the receive path.

Optionally, in any of the previous aspects, the first phase shifter is tunable to perform transmit beamforming of a signal to be transmitted by the plurality of antenna elements.

Optionally, in any of the previous aspects, the second phase shifter is tunable to perform receive beamforming of a signal received by the plurality of antenna elements.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION

Figure 1:
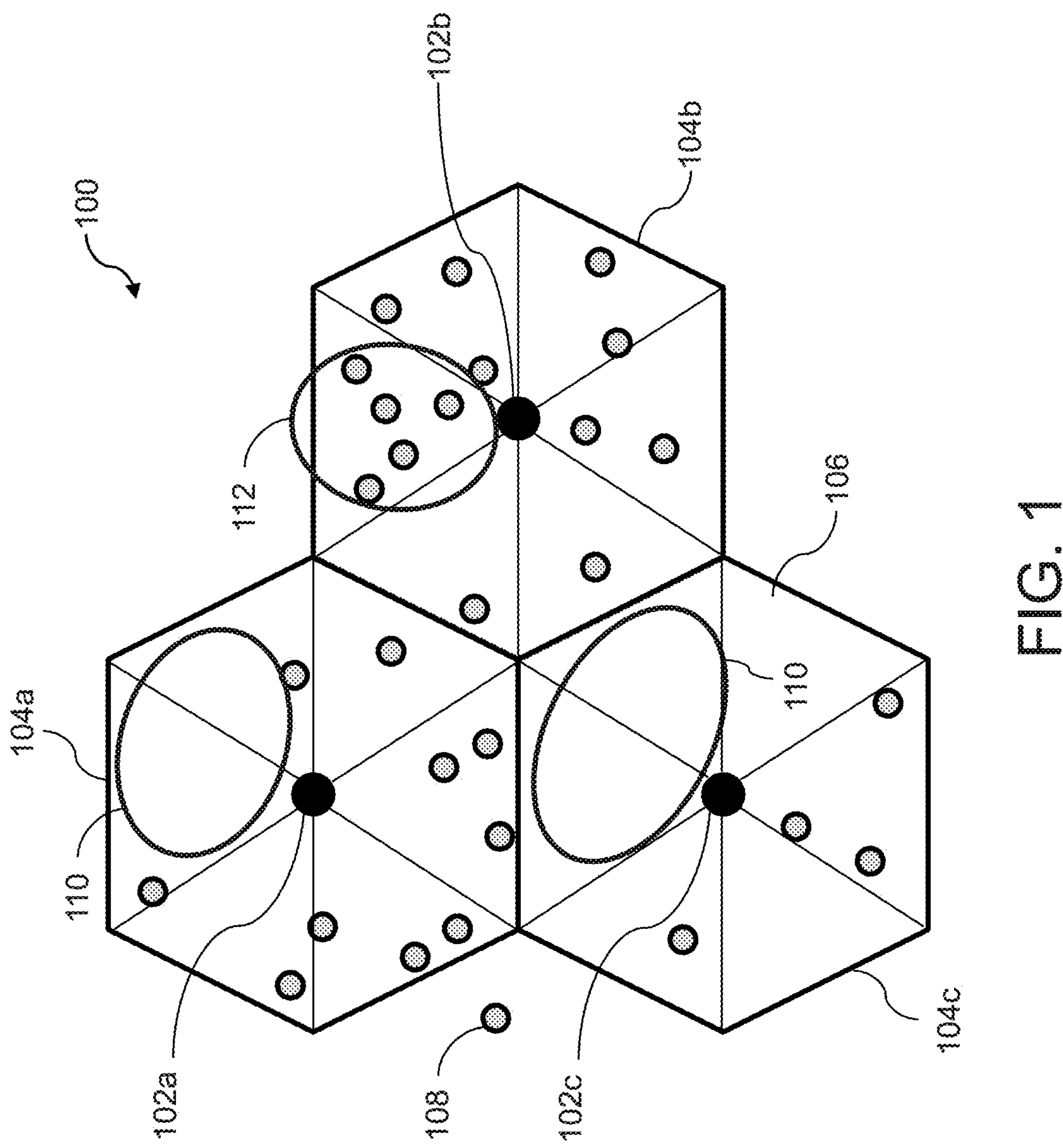
FIG. 1 is a schematic representation of a conventional cellular network.

Referring to FIG. 1, a cellular network 100 includes multiple base stations (BSs) 102*a*, 102*b*, 102*c* (individually or collectively 102), which each have a respective coverage area 104*a*, 104*b*, 104*c* approximated as a hexagon. Each coverage area 104 is divided into multiple angular sectors 106. More or fewer BSs 102 may be used, depending on factors such as the effective coverage range of each BS 102, the expected density of user devices accessing the network, and the total area for which network coverage is desired.

One or more devices 108 can access the cellular network 100, typically via a BS 102 whose coverage area include the location of the device 108. The device 108 and the BS may communicate using a standardized communication protocol, such as Third Generation Partnership Project (3GPP) fourth generation (4G) Long-Term Evolution (LTE) or fifth generation (5G) wireless communication. Communication between a device 108 and a BS 102 typically includes uplink (UL) transmissions from the device 108 to the BS 102, and downlink (DL) transmissions from the BS 102 to the device 108. The communication may be time-division duplex (TDD), in which some time intervals are reserved for UL and other time intervals are reserved for DL. The communication may be frequency-division duplex (FDD), in which some frequency ranges are reserved for UL and other frequency ranges are reserved for DL. Other modes of communication may be used.

Depending on the spatial distribution of the devices 108, some regions 110 may be underutilized and other regions 112 may be crowded. Each of these regions may correspond to one or more sectors 106. A sector 106 containing an underutilized region 110 may result in underutilization of the network resources, and a sector 106 containing a crowded region 112 may result in some devices 108 experiencing a reduced level of service due to overloading of the network resources.

Figure 2:
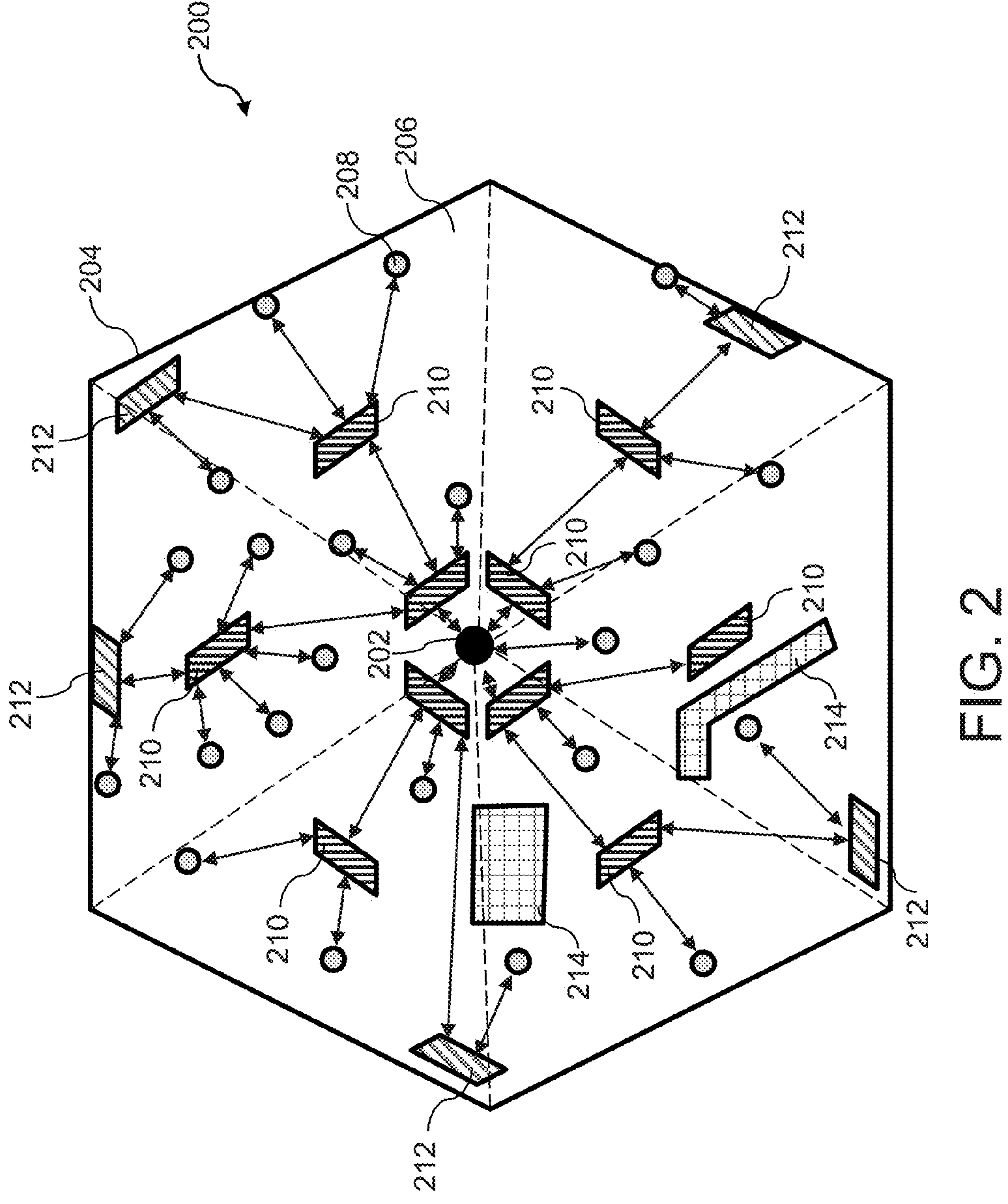
FIG. 2 is a schematic representation of a cellular network implemented according to an embodiment.

Referring to FIG. 2, an example cellular network 200 according to an embodiment will be described. In this example, only one BS 202 is shown, having a coverage area 204 divided into sectors 206, though it should be understood that multiple BSs 202 may be used to provide coverage to a larger area as shown in FIG. 1.

A number of devices 208 communicate with the BS 202, either directly or via one or more non-reciprocal arrays such as one or more smart lenses 210 and/or one or more smart reflectors 212 (collectively "smart surfaces"). The smart lenses 210 and the smart reflectors 212 may, for example, be antenna arrays such as nonreciprocal beam steerable meta-surfaces such as those described in international patent application publication no. WO 2022/094686, entitled "Nonreciprocal Beam Steerable Metasurfaces", the contents of which are incorporated by reference herein in their entirety. The BS 202, the devices 208, the smart lenses 210, and the smart reflectors 212 may optionally use directional communication such as beamforming and beam steering to ensure that transmissions are directed to the desired target, as well as to reduce interference and allow resources such as carrier frequencies to be reused in different sectors. By using the smart surfaces, network coverage can be provided for devices 208 whose direct communication with the BS is obstructed by an obstacle 214 such as a building or a tree, even if the communication is a type that would otherwise require a line of sight, e.g. millimeter wave (mm Wave) communication. The use of smart surfaces may also permit the BS 202 to better allocate resources between the sectors 206, for example by using the smart surfaces to direct a BS 202 communication from one sector to a device 208 in another sector. The smart surfaces may be capable of amplifying signals, which may enable the BS 202 to extend its coverage range. An extended coverage range for each BS 202 may enable the network to use fewer BSs to achieve a similar coverage.

Although examples are described herein with reference to a cellular network 200, the embodiments described may be implemented with other types of wireless networks, such as Private 5G, Wi-Fi networks, and the connected devices may be any type of device, such as Wi-Fi stations, smart phones, tablets, or IoT devices.

Figure 3:
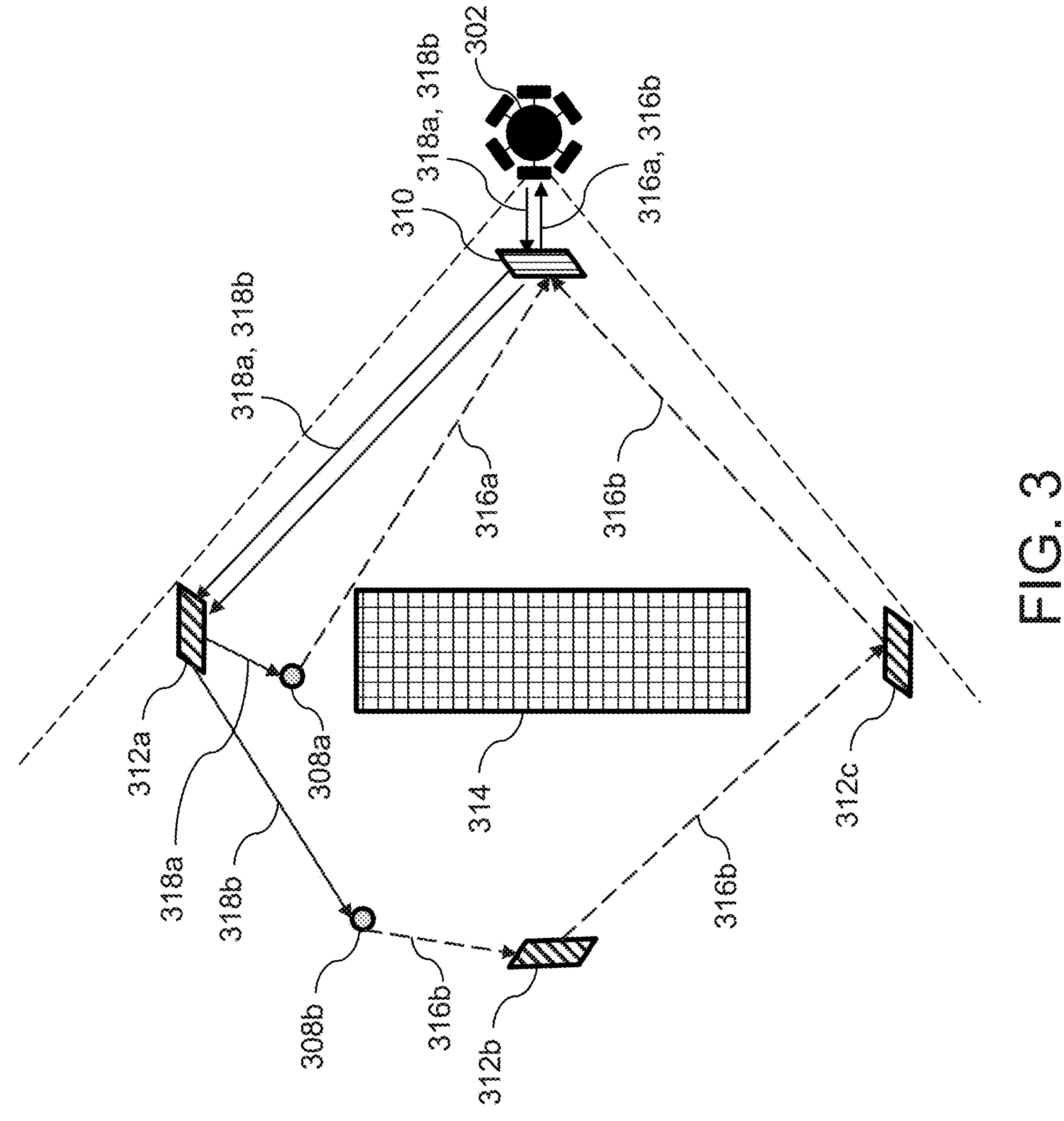
FIG. 3 is a schematic representation of a single sector of a cellular network having reflective and transmissive relays.

Referring now to FIG. 3, an example interaction between a BS 302 and two devices 308*a* and 308*b* using smart surfaces will be described, using smart lens 310 and smart reflectors 312*a*, 312*b*, and 312*c*.

The UL transmission 316*a* from device 308*a* is transmitted directly toward the smart lens 310 associated with the BS 302, taking advantage of the line of sight between the device 308*a* and the BS 302. The device 308*b* does not have a line of sight to the BS 302 due to the obstacle 314, so the device 308*b* transmits its UL transmission via the smart reflectors 312*b* and 312*c* to the smart lens 310. The smart lens 310 directs both UL transmissions 316*a*, 316*b* toward the BS 302, in a manner that will be described below in further detail.

The DL transmissions 318*a* and 318*b* are transmitted by the BS 302 toward smart lens 310, which directs them toward the smart reflector 312*a*. The smart reflector 312*a* directs the DL transmission 318*a* toward the device 308*a* and the DL transmission 318*b* toward the device 308*b*. The non-reciprocity of the smart reflector 312*a* prevents the device 308*a* from transmitting an UL communication on the reverse path of the DL transmission 318*b*.

As a result, each device 308 has different spatial paths for its UL transmission 316 than for its DL transmission 318. In addition, the smart surfaces 310, 312 are beam-steerable, and can redirect signals to any desired direction by using beam-steering techniques. This permits the smart surfaces 310, 312 to reuse network resources such as time and frequency, by taking advantage of the directional and frequency selectivity of the smart surfaces 310, 312, as will be described below in further detail.

Each of the smart lens 310 and smart reflectors 312*a*, 312*b*, and 312*c* may optionally amplify the transmissions with which it interacts.

Figure 4:
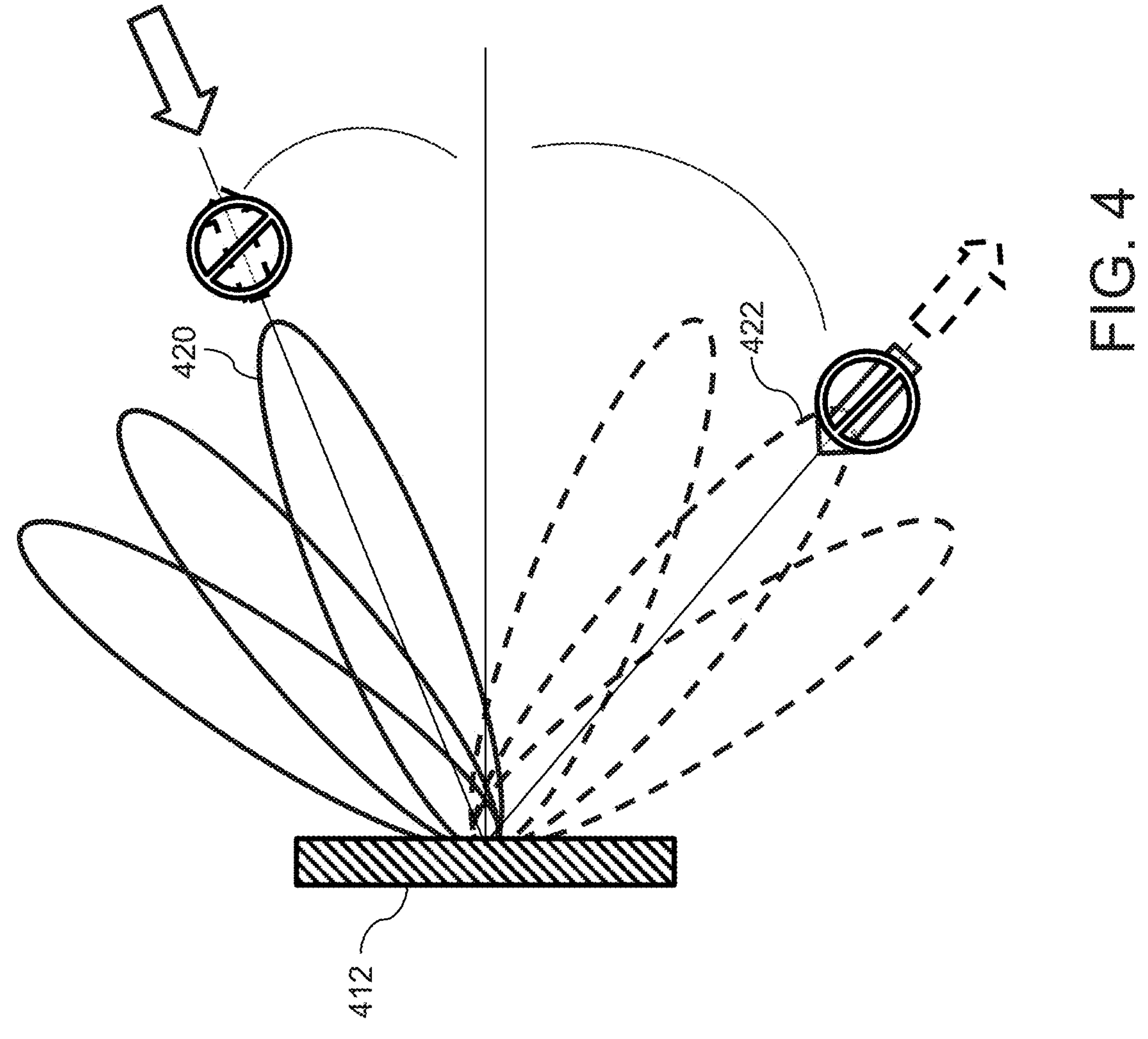
FIG. 4 is a schematic representation of a reflective nonreciprocal surface.

Referring now to FIG. 4, an example smart reflector 412 is a non-reciprocal surface, containing a nonreciprocal antenna array (not shown) that can amplify an incoming wireless signal 420 from a particular angle and redirect the outgoing signal 422 at a different angle. The angles of the incoming and outgoing signals can be dynamically adjusted independently based on network performance criteria. The smart reflector 412 operates on the wireless signal in the physical layer, and is agnostic to the modulation scheme and frequency of operation of the incoming signal 420. The smart reflector 412 may receive multiple concurrent incoming signals and redirect them at different respective outgoing angles, for example if the incoming signals are at different frequencies or from different angles. Due to the nonreciprocal nature of the smart reflector 412, there is no signal in the reverse direction.

Figure 5:
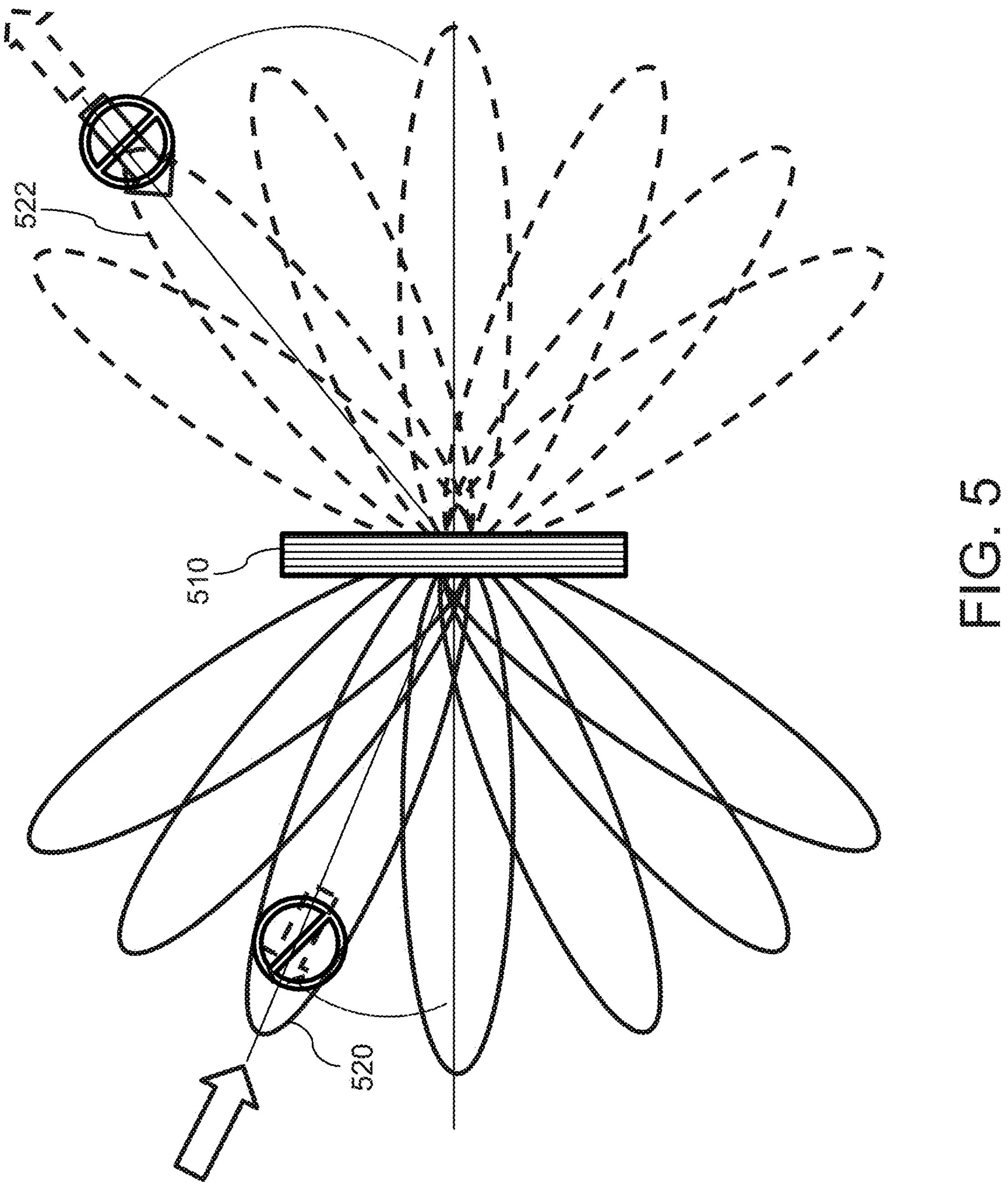
FIG. 5 is a schematic representation of a transmissive nonreciprocal surface operating in a unidirectional mode.

Referring now to FIG. 5, an example smart lens 510 is a non-reciprocal surface, containing a nonreciprocal antenna array (not shown) on each of two opposing faces, that can amplify an incoming wireless signal 520 from a particular angle and redirect the outgoing signal 522 at a different angle. The angles of the incoming and outgoing signals can be dynamically adjusted independently based on network performance criteria. The smart lens 510 operates on the wireless signal in the physical layer, and is agnostic to the modulation scheme and frequency of operation of the incoming signal 520. The smart lens 510 may receive multiple concurrent incoming signals and redirect them at different respective outgoing angles, for example if the incoming signals are at different frequencies or from different angles. Due to the nonreciprocal nature of the smart lens 510, there is no signal in the reverse direction.

Figure 6:
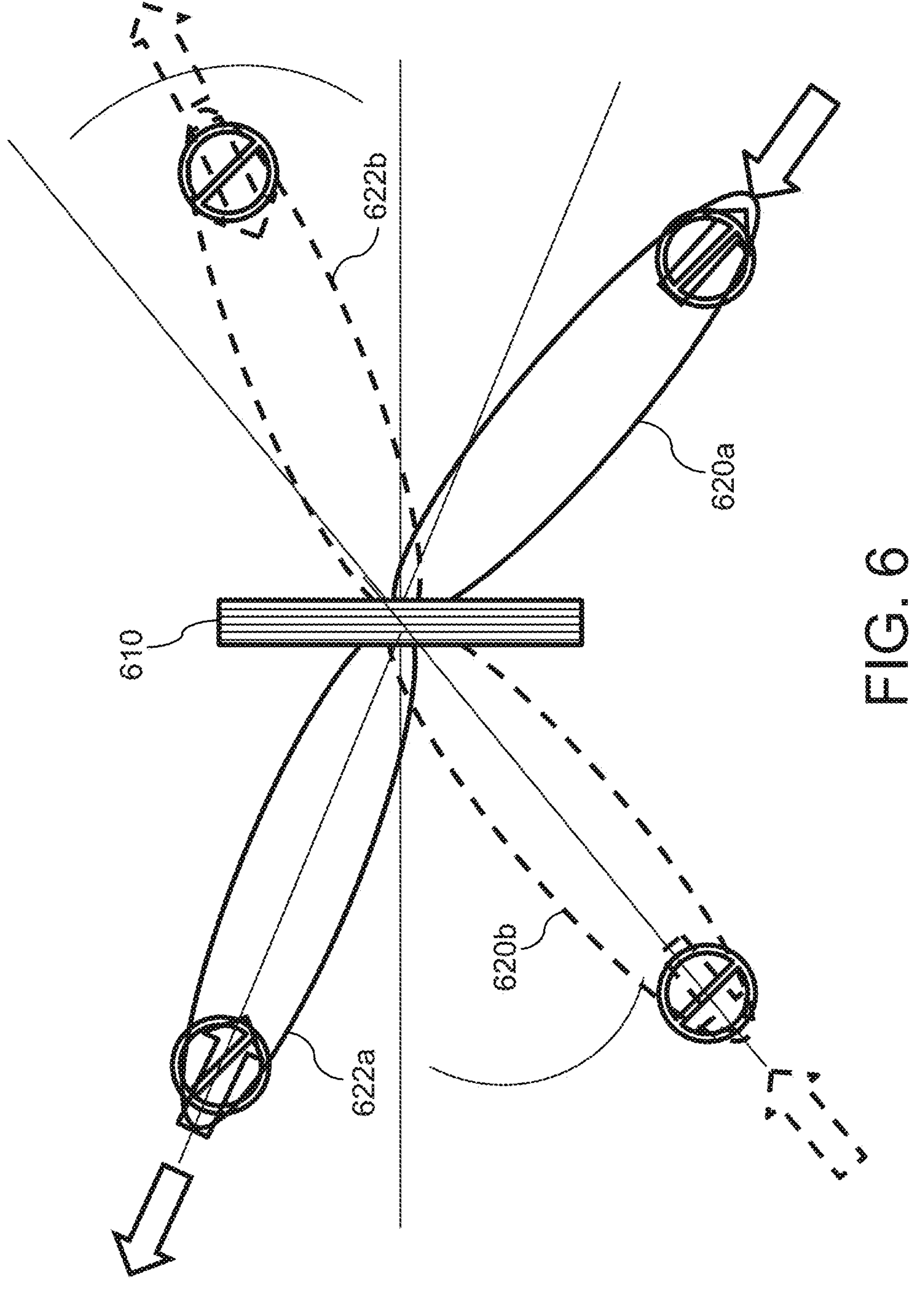
FIG. 6 is a schematic representation of a full duplex nonreciprocal transmissive repeater.

Referring now to FIG. 6, the smart lens 610 includes a nonreciprocal antenna array on each of two opposing faces, that amplifies an incoming RF signal from a particular angle and redirects the outgoing signal to a different angle. The angle of the incoming and outgoing signal can be dynamically adjusted independently based on network performance criteria. The smart lens 610 can redirect a first incoming signal 620*a* in a first output direction as the outgoing signal 622*a*, and can concurrently redirect a second incoming signal 620*b* in a second output direction as the outgoing signal 622*b*. The smart lens 610 can dynamically and independently adjust the directions of the outgoing signals 622*a*, 622*b*. This can be done even if the incoming signals 620*a*, 620*b* have the same frequency, due to the frequency selectivity and beam steering capability of the smart lens 610. In this manner, the smart lens 610 can enable full duplex operation. Although not shown, the smart reflectors previously described have a similar full duplex capability.

Figure 7:
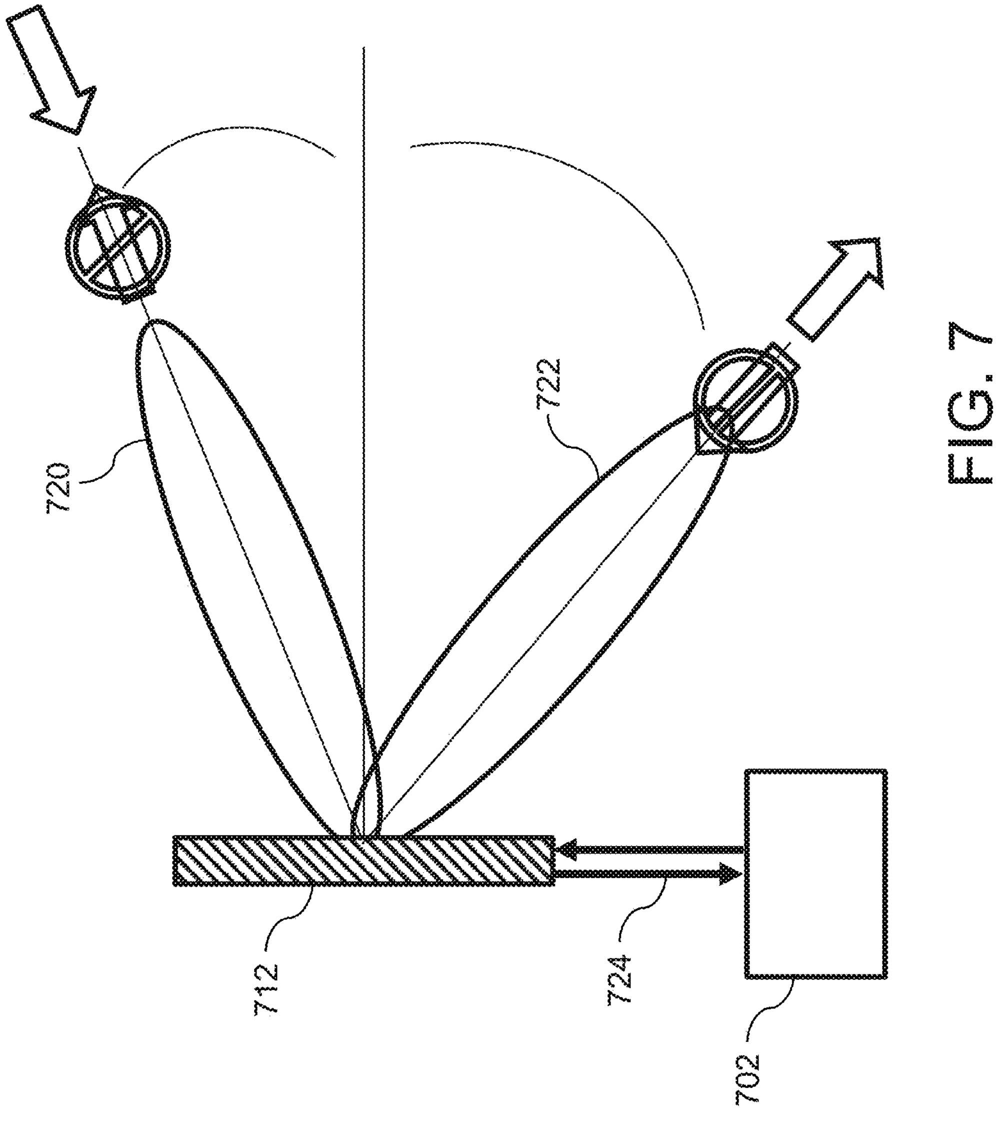
FIG. 7 is a schematic representation of a nonreciprocal phased array.

Referring now to FIG. 7, an antenna array forming a smart surface such as a non-reciprocal phased array 712 may have a wired connection 724 to a BS 702. An incoming signal 720 may be transmitted from the non-reciprocal phased array 712 to the BS 702 via the wired connection 724. An signal may be transmitted from the BS 702 to the non-reciprocal phased array 712 and then transmitted as an outgoing signal 722 in a desired beam direction. Both the incoming signal angle and outgoing signal can be independently beam steered across the full angular range. The signal may be amplified by the surface. Signals traveling in the reverse direction are cancelled.

Figure 8:
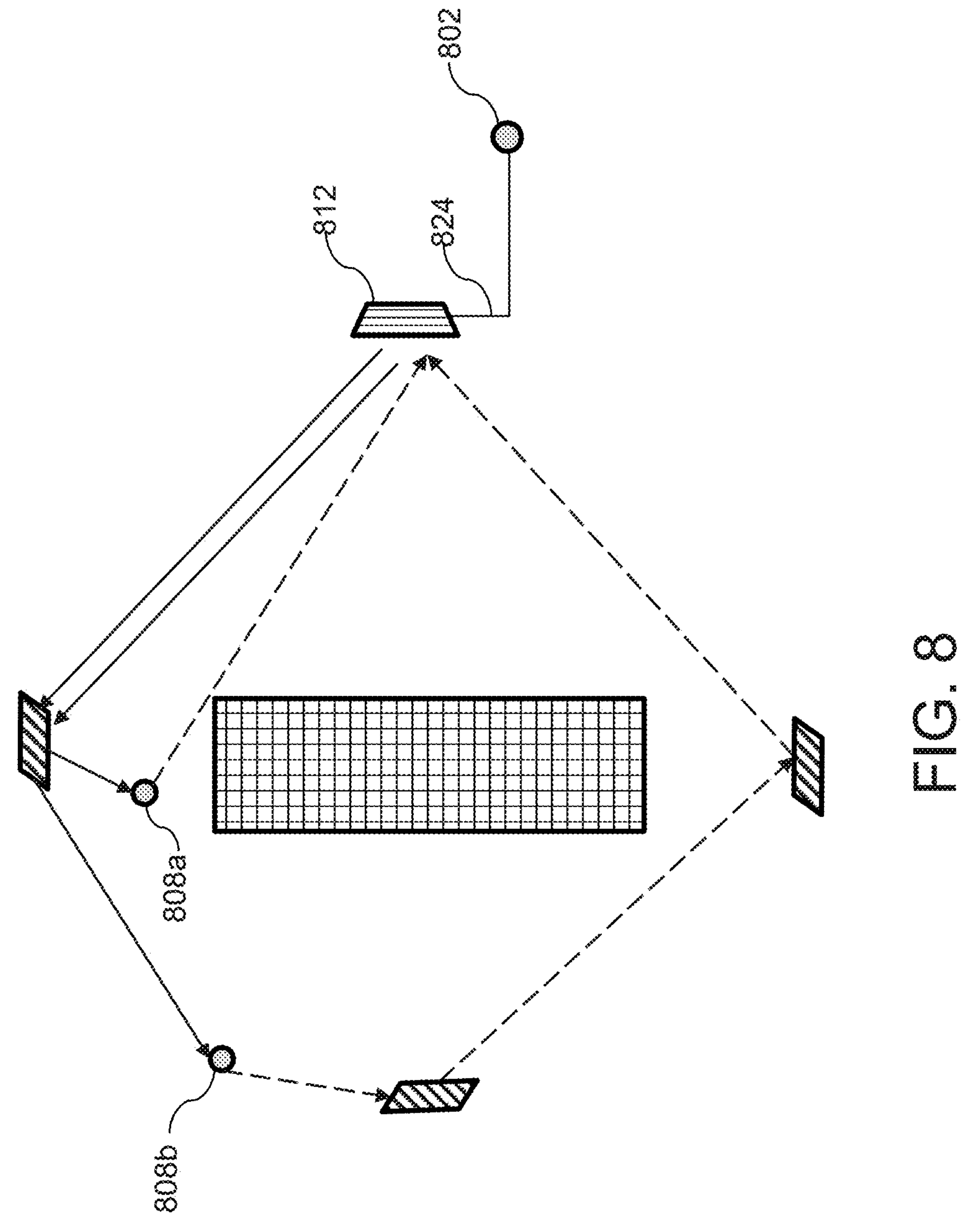
FIG. 8 is a schematic representation of a nonreciprocal phase array shown in a small cell embodiment.

Referring now to FIG. 8, a small cell implementation will be described. A small cell access point 802 has a wired connection 824 to smart surface 812, as described with respect to FIG. 7. The smart surface 812 communicates in UL and DL with devices 808*a* and 808*b*, using smart surfaces, as described with respect to FIG. 3. The smart surface 812 can independently and dynamically control the directions of outgoing signals, and can receive incoming signals from different beam directions.

Figure 9:
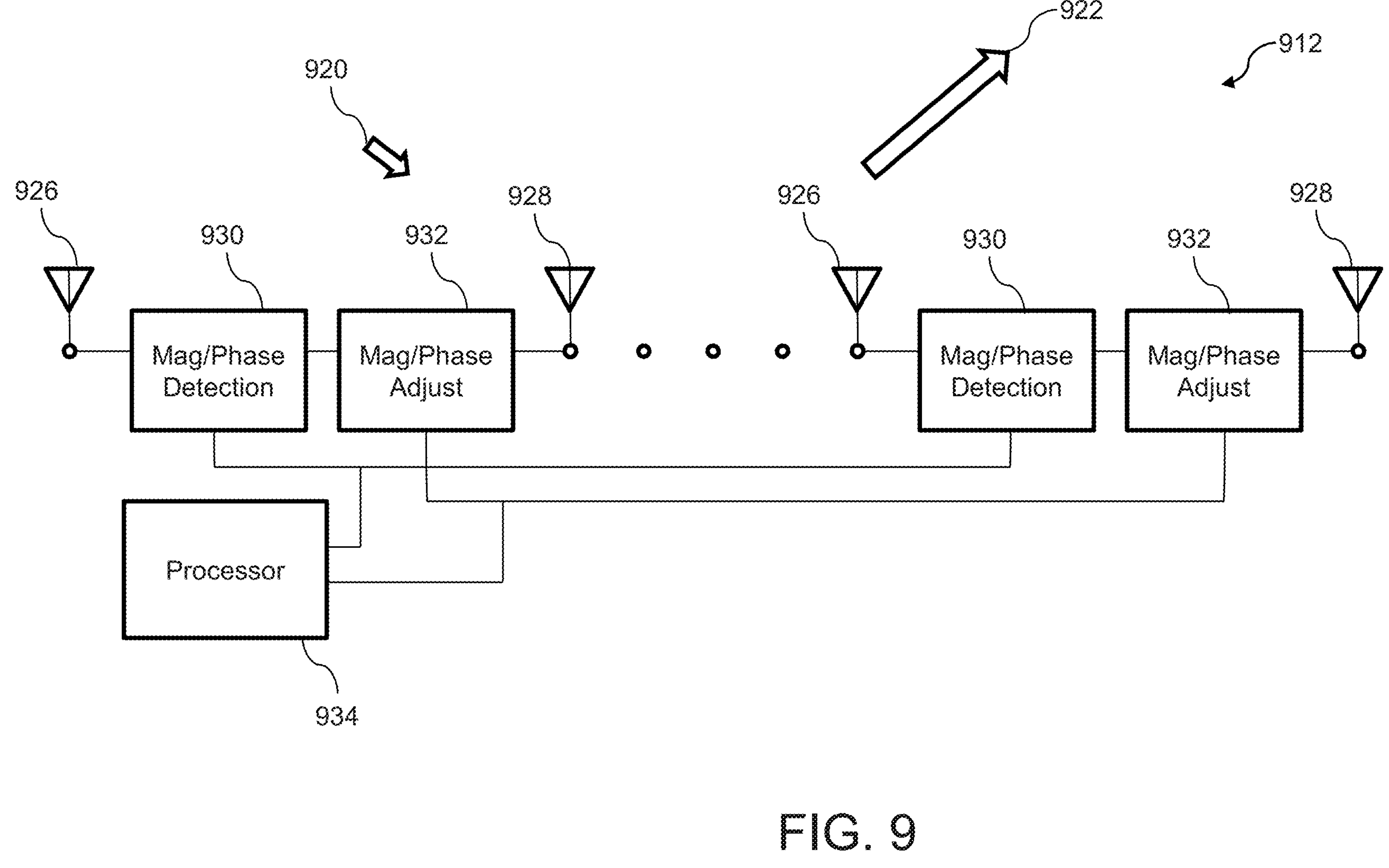
FIG. 9 is a block diagram of a reflective nonreciprocal surface.

Referring now to FIG. 9, an example smart reflector 912 will be described, which may be used in any of the previously described embodiments. The smart reflector 912 includes an array of receive antennas 926, only two of which are shown, and an array of transmit antennas 928, only two of which are shown. Each array of antennas may be an evenly spaced array, and may use phase differences between successive antennas to perform transmit or receive beamforming in a known manner. For this purpose, each receive antenna 926 is connected to a respective transmit antenna 928 with a magnitude and phase detection unit 930 and a magnitude and phase adjustment unit 932. The magnitude and phase detection units 930 and the magnitude and phase adjustment units 932 are controlled by a processor 934 that performs the necessary computations for receive beamforming of the incoming signal 920, and for transmit beamforming of the outgoing signal 922, as well as for optional amplification of the outgoing signal 922.

Figure 10:
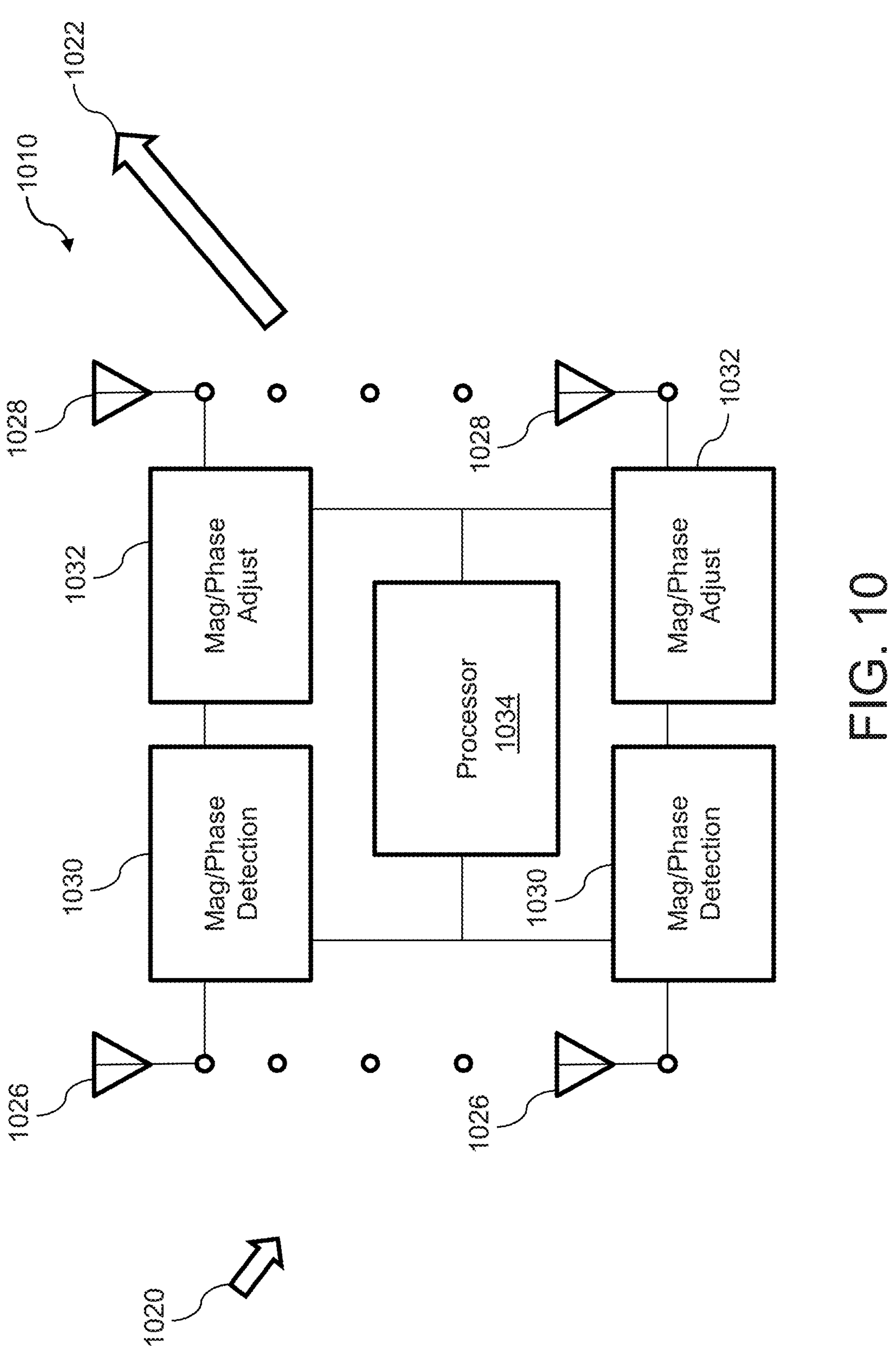
FIG. 10 is a block diagram of a transmissive reflective nonreciprocal surface.

Referring now to FIG. 10, an example smart lens 1010 will be described, which may be used in any of the previously described embodiments. The smart lens 1010 includes an array of receive antennas 1026, only two of which are shown, and an array of transmit antennas 1028, only two of which are shown. Each array of antennas may be an evenly spaced array, and may use phase differences between successive antennas to perform transmit or receive beamforming in a known manner. For this purpose, each receive antenna 1026 is connected to a respective transmit antenna 1028 with a magnitude and phase detection unit 1030 and a magnitude and phase adjustment unit 1032. The magnitude and phase detection units 1030 and the magnitude and phase adjustment units 1032 are controlled by a processor 1034 that performs the necessary computations for receive beamforming of the incoming signal 1020, and for transmit beamforming of the outgoing signal 1022, as well as for optional amplification of the outgoing signal 1022.

Figure 11:
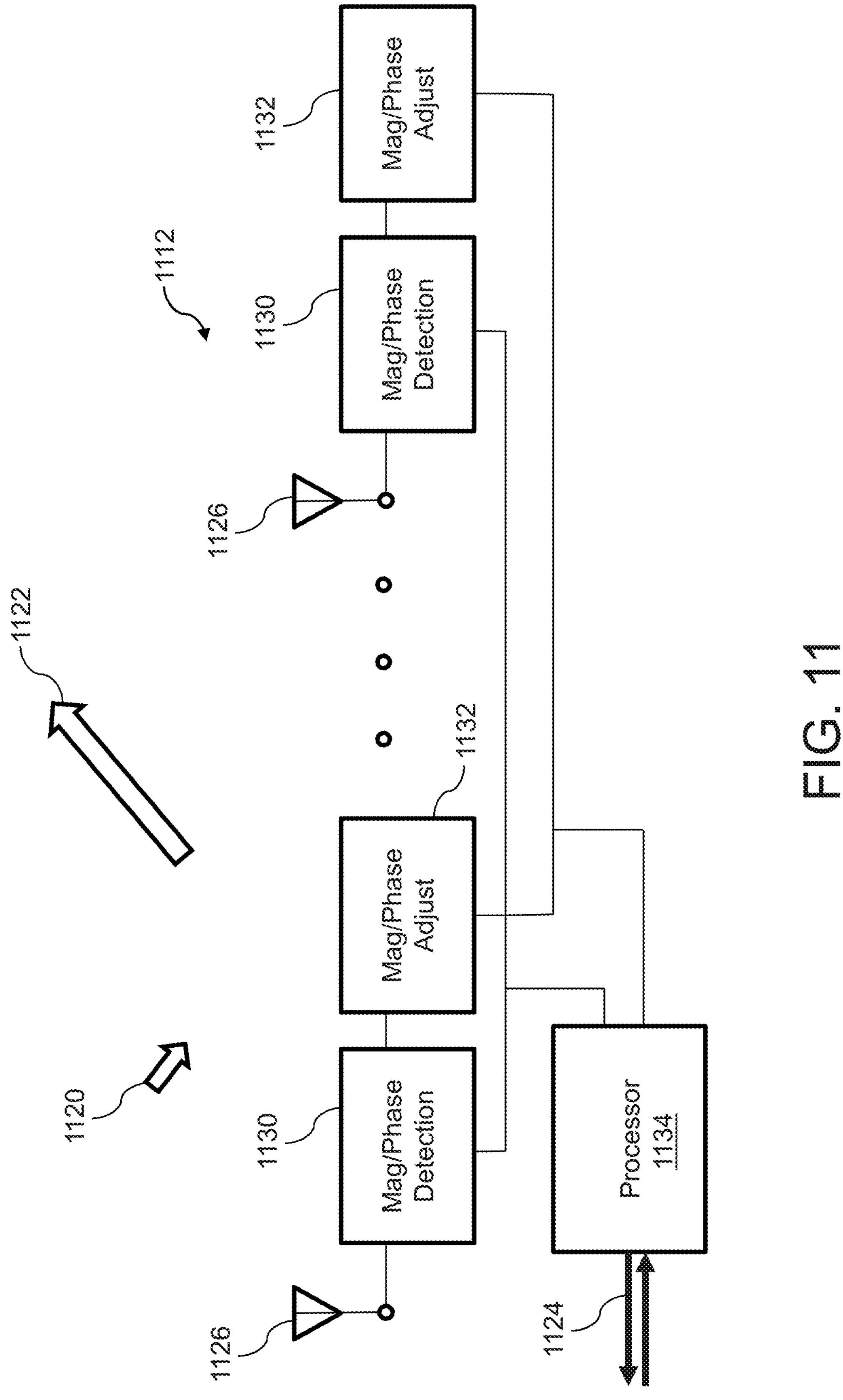
FIG. 11 is a block diagram of a nonreciprocal phased array.

Referring now to FIG. 11, an example smart reflector 1112 will be described, which may be used in any of the previously described embodiments. The smart reflector 1112 includes an array of antennas 1126, only two of which are shown. The array of antennas may be an evenly spaced array, and may use phase differences between successive antennas to perform transmit or receive beamforming in a known manner. For this purpose, each receive antenna 1126 is connected to a respective magnitude and phase detection unit 1130 and a respective magnitude and phase adjustment unit 1132. The magnitude and phase detection units 1130 and the magnitude and phase adjustment units 1132 are controlled by a processor 1134 that performs the necessary computations for receive beamforming of the incoming signal 1120, and for transmit beamforming of the outgoing signal 1122, as well as for optional amplification of the outgoing signal 1122. A wired connection 1124 connects the smart reflector 1112 to a wired portion of the network (not shown).

Figure 12:
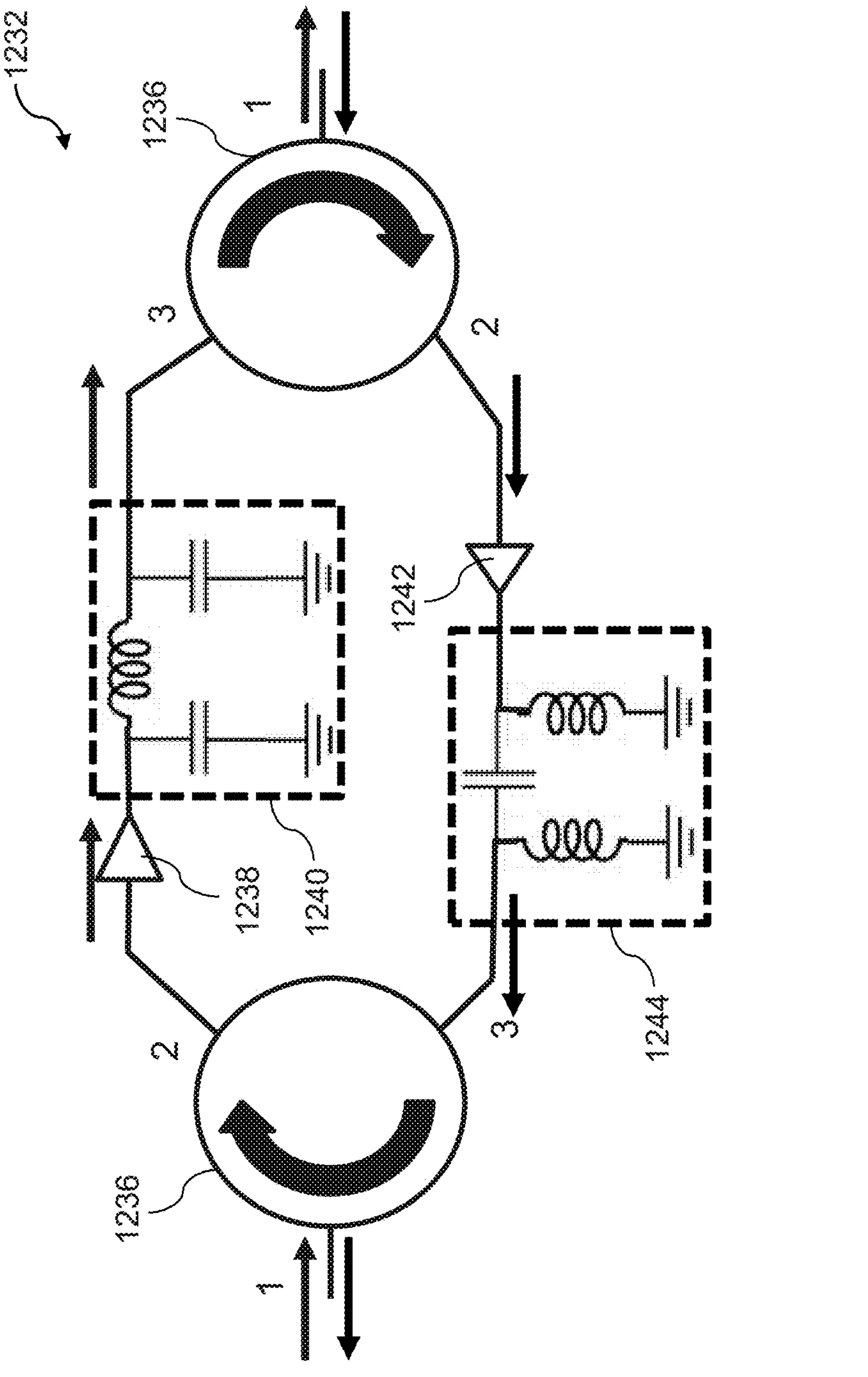
FIG. 12 is a circuit diagram of a magnitude and phase adjustment block.

Referring now to FIG. 12, an example magnitude and phase adjustment unit 1232 will be described, which may be used in any of the previously described embodiments. The top branch is isolated from the bottom branch by a pair of three-port circulators 1236, arranged so that signals going from right to left only travel through the bottom branch, and signals going from left to right only travel through the top branch. The top branch includes a unilateral amplifier 1238 and a phase shifter 1240. The phase shifter 1240 may be implemented with any suitable circuitry. The bottom branch includes a unilateral amplifier 1242 and a phase shifter 1244. The phase shifter 1244 may be implemented with any suitable circuitry. By controlling the unilateral amplifiers 1238, 1242 and the phase shifters 1236, 1240, the amplitude and phase of signals in opposite directions (e.g., transmit and receive directions) can be independently controlled, thereby enabling both amplification and beamforming as desired.

Figure 13:
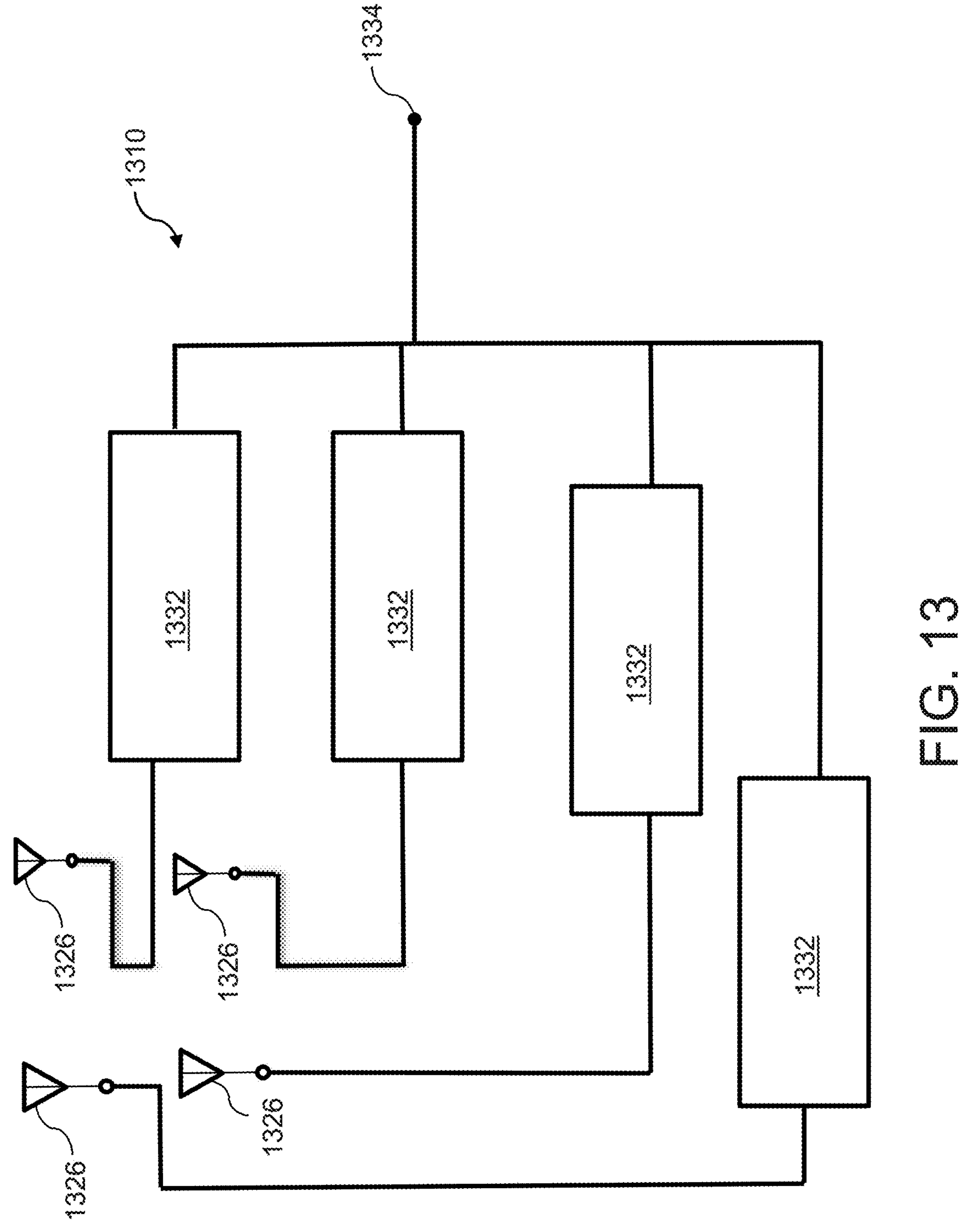
FIG. 13 is a circuit diagram of an embodiment of a nonreciprocal phased array architecture using the magnitude and phase adjust block of FIG. 12.

Referring now to FIG. 13, a configuration of a non-reciprocal phased array 1310 is shown. A smart mirror would have a similar configuration. Each antenna 1326 is connected to the transceiver chain or transceiver port 1334 via a magnitude and phase adjustment unit 1332 similar to the magnitude and phase adjustment unit 1232 of FIG. 12. The antennas 1326 may be arranged in a two-dimensional grid, and the phase shifters of the individual magnitude and phase adjustment units 1332 configured to vary the phases of the antennas in two dimensions across the grid, thereby to perform transmit and receive beamforming. Because each magnitude and phase adjustment unit 1332 has separate phase shifters for the transmit and receive paths, the transmit and receive beamforming may be configured independently. As a result, the latency between transmitting and receiving that is associated with tuning the phase shifters from the transmit beam to the receive beam can be reduced. Thus, this configuration may be particularly advantageous for TDD communications. It is contemplated that more than four antennas 1326 may be used, with each antenna 1326 having a magnitude and phase adjustment unit 1332.

Figure 14:
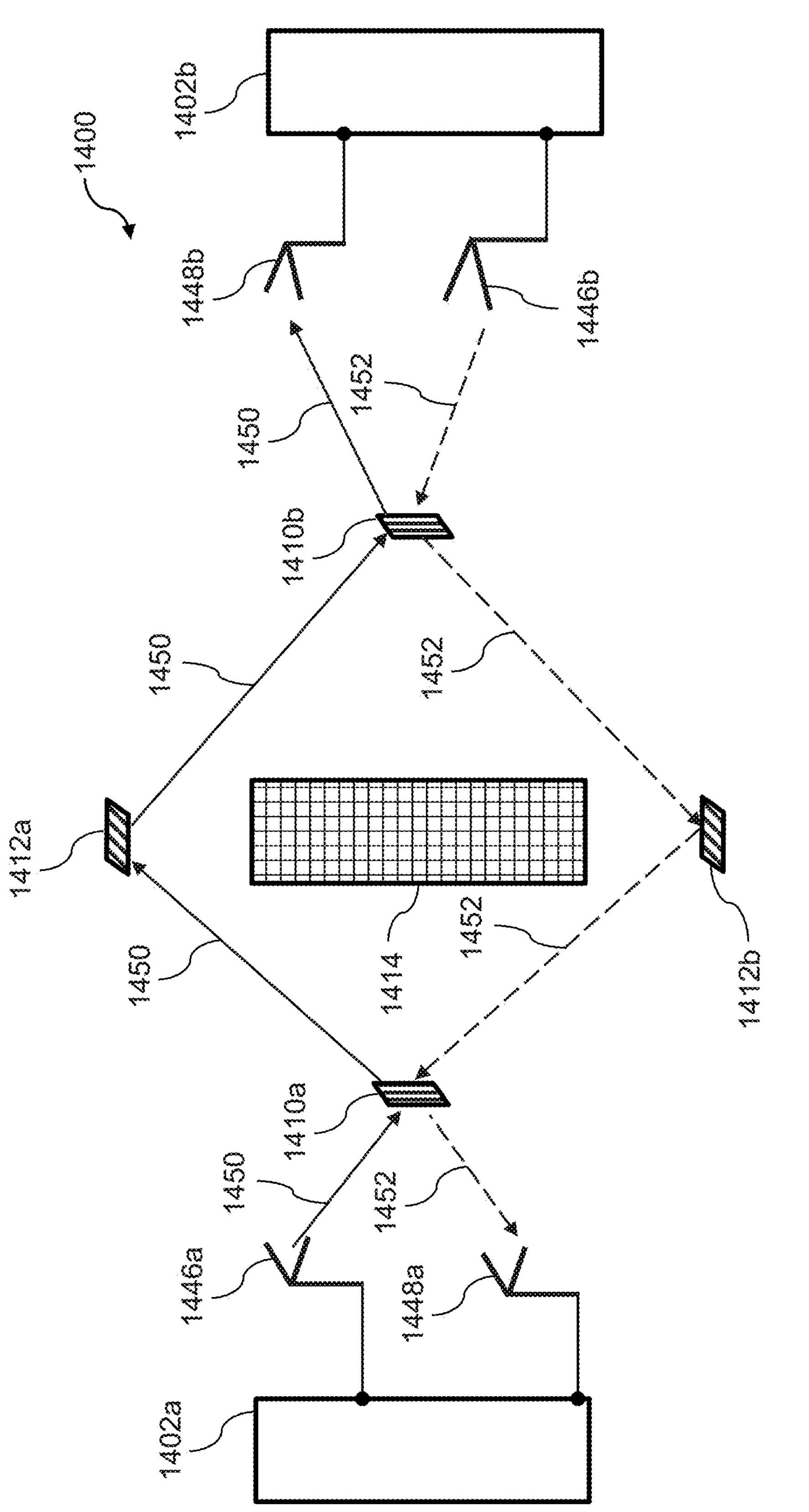
FIG. 14 is a schematic representation of nonreciprocal surfaces being used with multiple cells according to a first embodiment.

Referring now to FIG. 14, an example network architecture 1400 capable of full-duplex communication will be described. A first BS 1402*a* has one or more transmit antennas 1446*a* spatially separated from one or more receive antennas 1448*a*. A first smart lens 1410*a* is associated with the BS 1402*a*, for example by being situated nearby the BS 1402*a*. A second BS 1402*b* has one or more transmit antennas 1446*b* spatially separated from one or more receive antennas 1448*b*. A second smart lens 1410*b* is associated with the BS 1402*b*, for example by being situated nearby the BS 1402*b*.

A first transmission 1450 is transmitted from the antenna 1446*a* in the direction of the smart lens 1410*a*. The smart lens 1410*a* optionally amplifies the transmission 1450 and redirects the transmission 1450 toward the smart lens 1410*b* via the smart reflector 1412*a*. The smart lens 1410*b* redirects the transmission 1450 to the antenna 1448*b* of the BS 1402*b*. Because of the nonreciprocal operation of the smart surfaces 1410, 1412, no signal is reflected back along the reverse direction of the transmission 1450.

A second transmission 1452 is transmitted from the antenna 1446*b* in the direction of the smart lens 1410*b*. The smart lens 1410*b* optionally amplifies the transmission 1452 and redirects the transmission 1452 toward the smart lens 1410*a* via the smart reflector 1412*b*. The smart lens 1410*a* redirects the transmission 1452 to the antenna 1448*a* of the BS 1402*a*. Because of the nonreciprocal operation of the smart surfaces 1410, 1412, no signal is reflected back along the reverse direction of the transmission 1452. In the absence of the obstacle 1414, one or the other of the transmissions 1450, 1452 could optionally be transmitted directly between the smart lenses 1410*a*, 1410*b*.

Because the transmissions 1450, 1452 take different paths, the transmission 1452 arrives at the smart lens 1410*a* at a different angle from the angle at which the smart lens 1410*a* transmits the transmission 1450. As such, the nonreciprocal nature of the smart lens 1410*a* permits it to receive the transmission 1452 without an unacceptable amount of interference from the outgoing transmission 1450, i.e. at an acceptable signal to interference and noise ratio (SINR), even if they are transmitted at the same time and using the same frequency. The nonreciprocal nature of the smart lens 1410*a* also permits it to transmit the transmission 1452 to the antenna 1448*a* while receiving the transmission 1450 from the antenna 1446 in a different direction, even if they are transmitted at the same time and using the same frequency. As a result, the BS 1402*a* can receive the transmission 1452 on a different antenna from the antenna transmitting the transmission 1450. The BS 1402*a* can therefore decode the transmission 1452 without an unacceptable amount of interference from the outgoing transmission 1450, even if they are transmitted at the same time and using the same frequency. As such, the use of the smart lens 1410*a* can enable FD communications in a conventional BS 1402*a* that is only configured for HD communication.

It is contemplated that one or more of the smart reflectors 1412 may be nonreciprocal surfaces, which may provide a high degree of isolation between the transmitted signal and a received signal or a reflection of the transmitted signal toward the transmitter, and which may permit one or more of beamforming, beam steering, and signal amplification. It is contemplated that one or more of the smart reflectors 1412 may be, or may be replaced by, reciprocal reflective surfaces, such as passive reflective surfaces. A passive reflective surface may include a metallic object capable of reflecting radio waves. Although a passive reflective surface would provide less isolation between transmitted and received signals, and would be unable to provide amplification of the reflected signals, it would reduce the cost and complexity of the network equipment.

Figure 15:
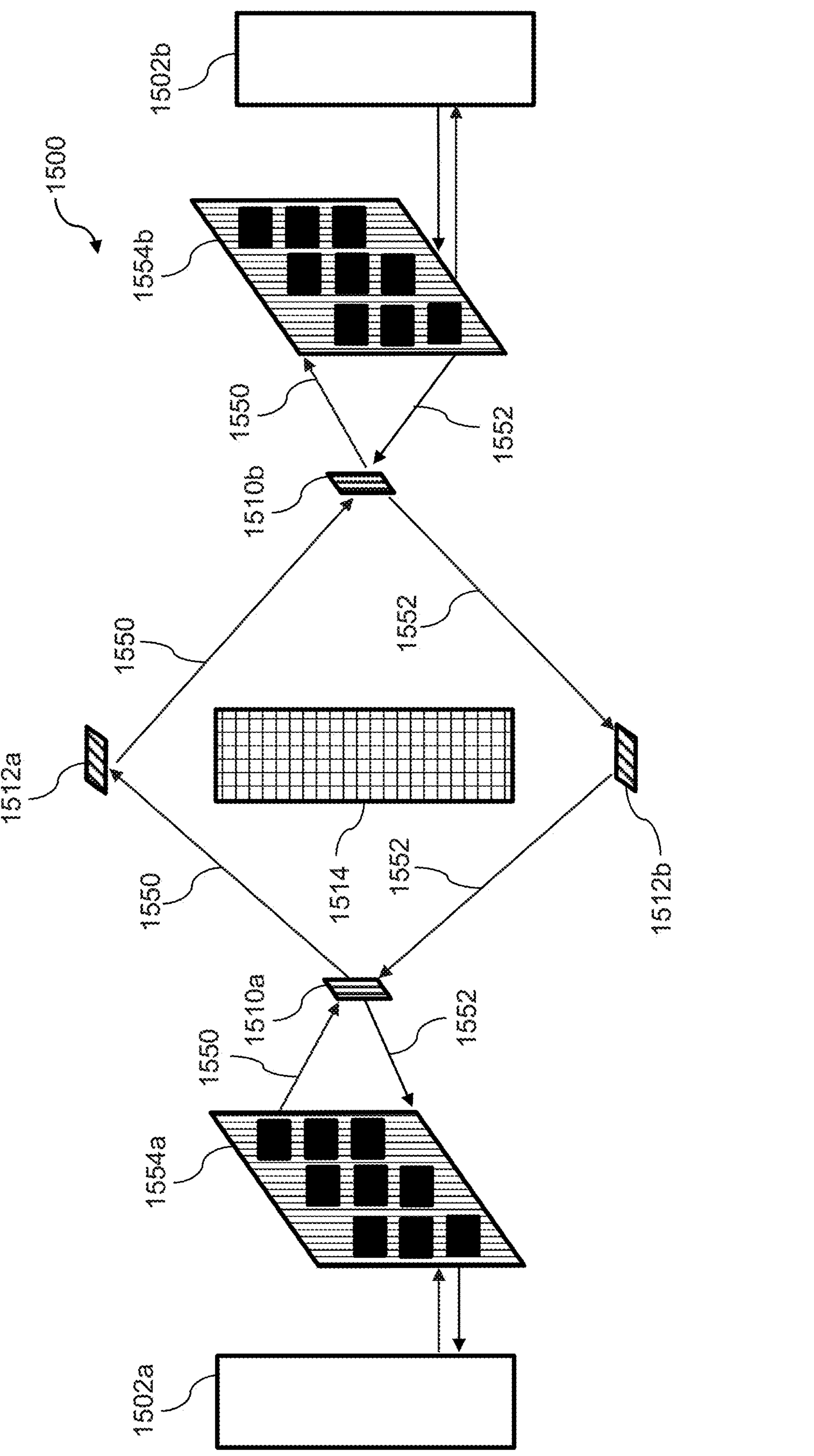
FIG. 15 is a schematic representation of nonreciprocal surfaces being used with multiple cells according to a second embodiment.

Referring now to FIG. 15, an example network architecture 1500 will be described. A first BS 1502*a* is connected, for example by a wired connection, to a phased array 1554*a* of antenna elements, capable of transmit and receive beamforming. A first smart lens 1510*a* is associated with the BS 1502*a*, for example by being situated nearby the BS 1502*a*. A second BS 1502*b* is connected, for example by a wired connection, to a phased array 1554*b* of antenna elements, capable of transmit and receive beamforming. A second smart lens 1510*b* is associated with the BS 1502*b*, for example by being situated nearby the BS 1402*b*.

The transmission of the signals 1550, 1552, using the smart mirrors 1512*a*, 1512*b* and circumventing the obstacle 1514, is similar to the embodiment of FIG. 14, with the difference that the transmission and reception at the BSs 1502 is performed by the phased arrays 1554 instead of by the antennas 1446, 1448.

One advantage of the network architecture 1500 compared to the network architecture 1400 of FIG. 14 is that the phased array 1554 may smaller and less expensive to implement than the multiple antennas 1446, 1448. One disadvantage of the network architecture 1500 compared to the network architecture 1400 of FIG. 14 is that in some embodiments the elements of the phased array 1554 may not be sufficiently spaced apart to permit FD communication between the BS 1502 and its associated smart lens 1510.

Figure 16:
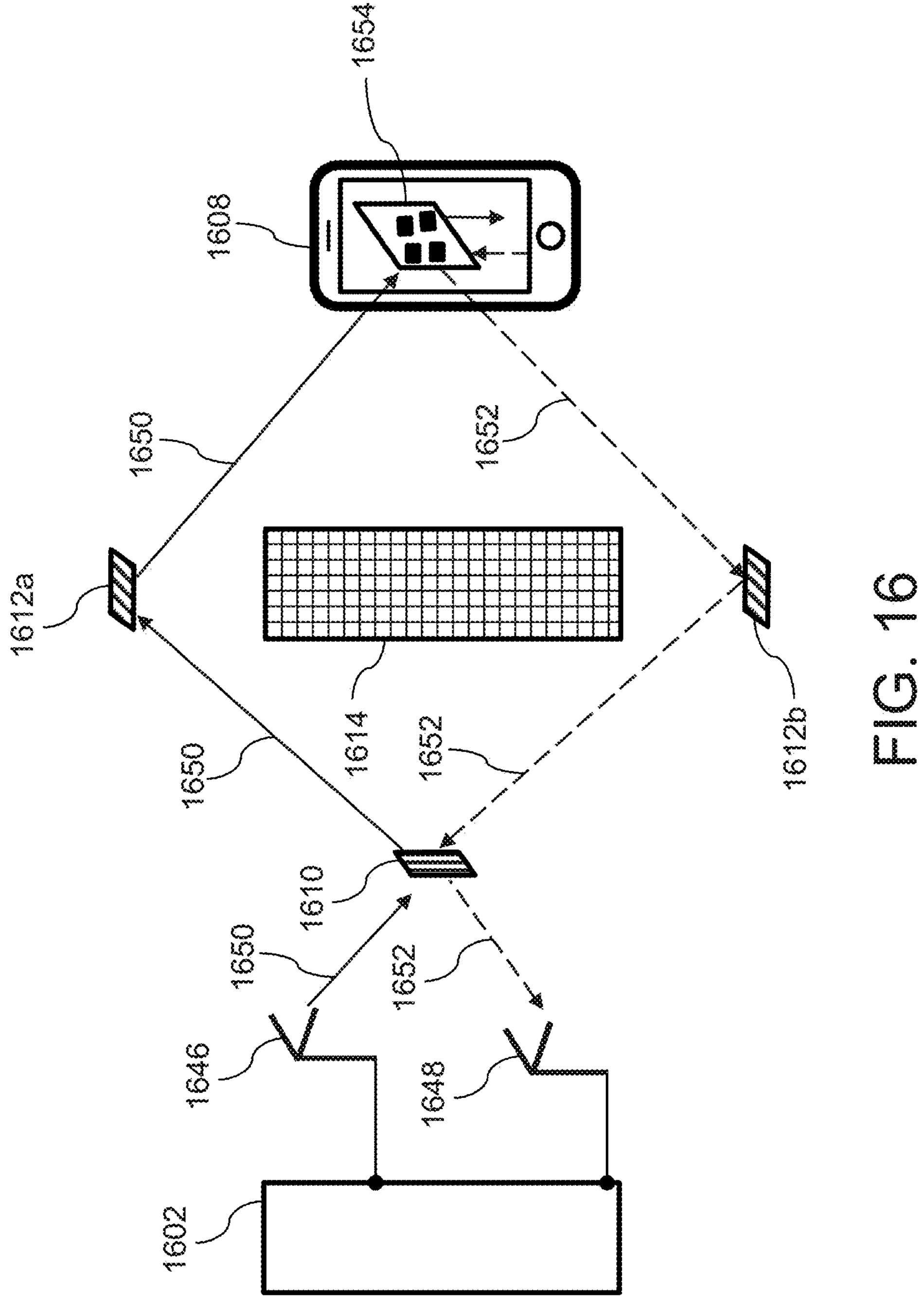
FIG. 16 is a schematic representation of nonreciprocal surfaces being used with multiple cells according to a fifth embodiment.

Referring to FIG. 16, a BS 1602 communicates with a device 1608 in a similar manner to the embodiments of FIGS. 14 and 15. A BS 1602 has one or more transmit antennas 1646 spatially separated from one or more receive antennas 1648. A smart lens 1410 is associated with the BS 1602, for example by being situated nearby the BS 1602. A device 1608 has a phased array 1654 of antenna elements, capable of transmit and receive beamforming, integrated into the device 1608. In one example, the phased array 1654 may be a mmWave array, and the device 1608 may be a tablet or a personal computer, though other implementations are contemplated.

A first transmission 1650 is transmitted from the antenna 1646 in the direction of the smart lens 1610. The smart lens 1610 optionally amplifies the transmission 1650 and redirects the transmission 1650 toward the device 1608 via the smart reflector 1612*a*. The transmission 1650 is received by the phased array 1654 of the device 1608, and can be decoded by the device 1608. A second transmission 1652 is transmitted from the phased array 1654 toward the smart lens 1610 via the smart reflector 1412*b*. The smart lens 1610 redirects the transmission 1652 to the antenna 1648 of the BS 1602.

Figure 17:
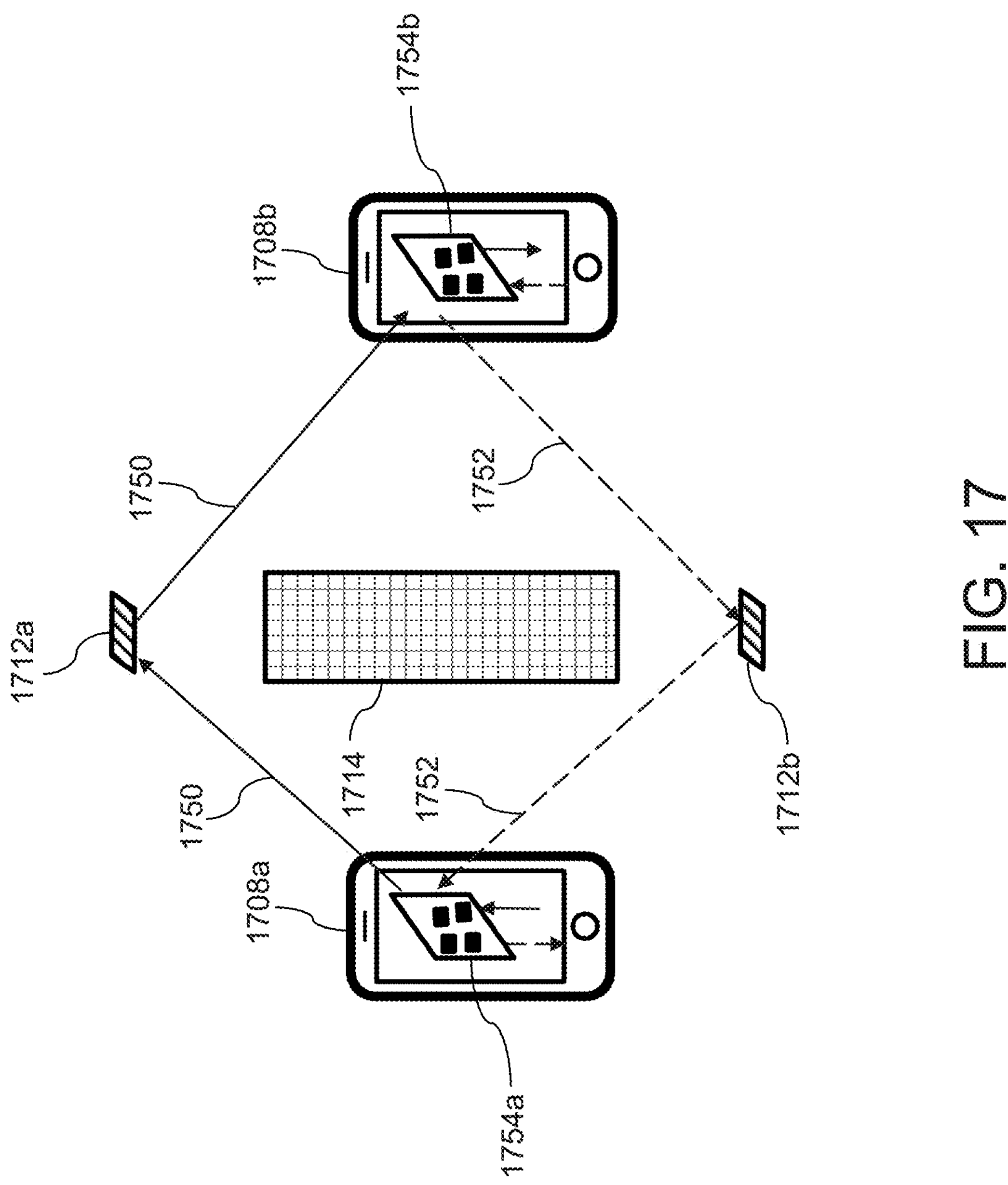
FIG. 17 is a schematic representation of nonreciprocal surfaces being used with multiple cells according to a sixth embodiment.

Referring now to FIG. 17, two devices 1708*a*, 1708*b* containing respective phased arrays 1754*a*, 1754*b* may communicate with each other via smart reflectors 1712*a*, 1712*b*, thereby permitting different communication paths for the opposite direction transmissions 1750, 1752, and enabling communication even in the presence of an obstacle 1714 preventing line-of-sight communication. In one example, the device 1754*a* may be a wireless gaming controller and the device 1754*b* may be a gaming console.

Figure 18:
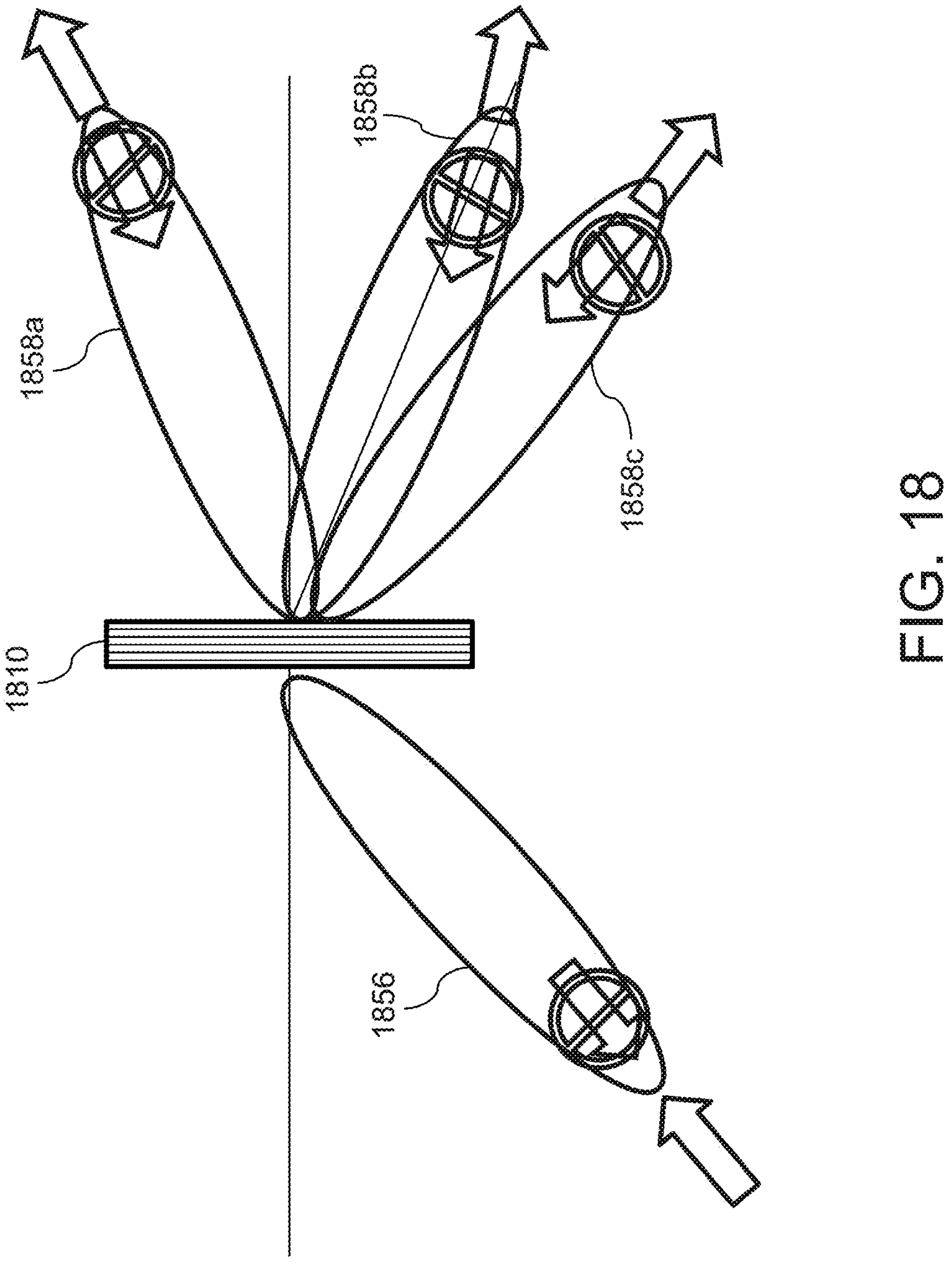
FIG. 18 is a schematic representation of frequency diverse nonreciprocal array.

Referring now to FIG. 18, some properties of a nonreciprocal smart surface 1810 will be described. An incident signal 1856 may be a wideband signal containing multiple frequencies, for example three different frequencies f1, f2, f3. The smart surface 1810 has a frequency-dependent response, such that the output signals 1858*a*, 1858*b*, 1858*c* at the respective frequencies f1, f2, f3 are transmitted in different directions. The frequency-dependent response is tunable by varying the configurable parameters of the smart surface 1810, as explained in further detail in international patent application publication no. WO 2022/094686. By utilizing this frequency-dependent response, a single beam containing multiple frequencies can be split onto multiple different paths and transmitted to different receivers. The nonreciprocal nature of the smart surface 1810 has the effect that a received beam along the reverse direction of 1858*a*, 1858*b*, or 1858*c*, for example a reflection caused by an obstruction, will not necessarily be propagated through the smart surface 1810 along the reverse path of the signal 1856.

Figure 19:
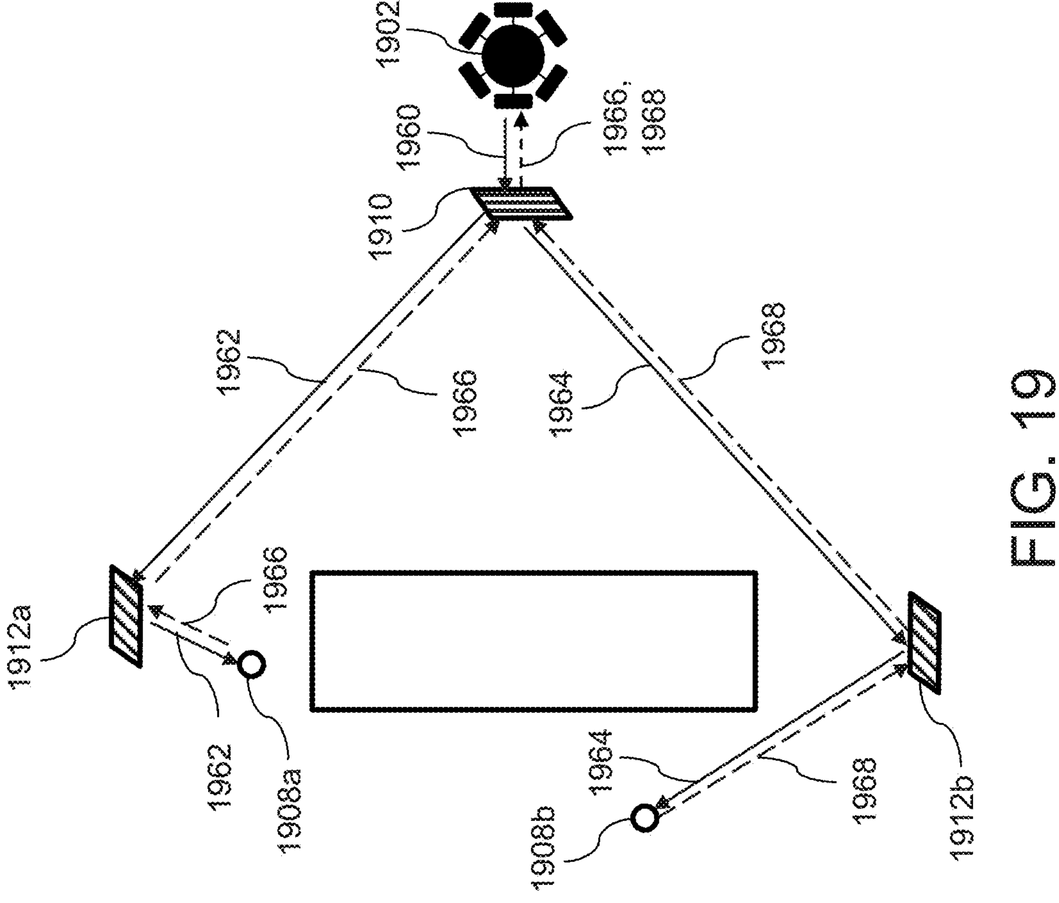
FIG. 19 is a schematic representation of a network implementation using a frequency diverse array.

An application of this property of frequency diversity is illustrated in FIG. 19. The BS 1902 transmits a downlink signal 1960 containing two different frequencies f1, f2 toward the smart lens 1910. The smart lens 1910 is configured to split the received signal 1960 into its f1 component signal 1962 and its f2 component signal 1964. The signal 1962 is transmitted in a beam directed toward the smart reflector 1912*a*, which redirects the signal 1962 to the device 1908*a*. The signal 1964 is transmitted in a beam directed toward the smart reflector 1912*b*, which redirects the signal 1964 to the device 1908*b*. At the same time or a different time, device 1908*a* transmits an uplink signal 1966 with frequency f3 toward the smart reflector 1912*a*, which redirects the signal 1966 toward the smart lens 1910. The smart lens 1910 is configured to redirect the signal 1966 with the frequency f3 toward the BS 1902. Device 1908*a* transmits an uplink signal 1968 with frequency f4 toward the smart reflector 1912*b*, which redirects the signal 1968 toward the smart lens 1910. The smart lens 1910 is configured to redirect the signal 1968 with the frequency f4 toward the BS 1902. In this manner, the frequency response of the smart lens 1910 can be used to direct multiple UL and DL signals to and from the BS 1902 without the need to re-tune the smart lens 1910.

Additional properties of the nonreciprocal smart surface 1810 are discussed in international patent application publication no. WO 2022/094686.

The embodiments described above are intended to be examples only. The scope of the invention is therefore intended to be limited solely by the appended claims.

The invention claimed is:

1. A method of using a non-reciprocal spatially-fed antenna for wireless communication; comprising:

receiving, by the non-reciprocal spatially-fed antenna, a first wireless signal from a base station in a first beam direction;

transmitting, by the non-reciprocal spatially-fed antenna, the first wireless signal in a second beam direction;

receiving, by the non-reciprocal spatially-fed antenna, a second wireless signal in a third beam direction; and transmitting, by the non-reciprocal spatially-fed antenna, the second wireless signal in a fourth beam direction toward the base station, wherein said transmitting the first wireless signal in the second beam direction and said receiving the second wireless signal in the third beam direction are performed concurrently and wherein the first and second wireless signals at least partially overlap in frequency, thereby enabling full duplex communication.

2. The method of claim 1, wherein the second beam direction is toward a first reflecting surface.

3. The method of claim 2, wherein the reflecting surface is a non-reciprocal reflecting surface.

4. The method of claim 2, wherein the third beam direction is toward a second reflecting surface.

5. The method of claim 4, wherein the second reflecting surface is a non-reciprocal reflecting surface.

6. The method of claim 1, wherein:

receiving the first wireless signal from the base station comprises receiving the first wireless signal from at least one first antenna of the base station; and transmitting the second wireless signal toward the base station comprises transmitting the second wireless signal to at least one second antenna of the base station;

wherein the at least one first antenna is spatially separated from the at least one second antenna.

7. The method of claim 6, wherein the first beam direction and the fourth beam direction are substantially nonparallel.

8. The method of claim 1, wherein the non-reciprocal spatially-fed antenna is a beam steerable metasurface.

9. A non-reciprocal surface comprising a plurality of antenna elements, each antenna element having at least one tunable phase shifter for shifting a phase of a signal transmitted or received by the antenna element, the non-reciprocal surface being configured for:

receiving a first wireless signal from a base station in a first beam direction;

transmitting the first wireless signal in a second beam direction;

receiving a second wireless signal in a third beam direction; and transmitting the second wireless signal in a fourth beam direction toward the base station, wherein the non-reciprocal surface is further configured for performing said transmitting the first wireless signal in the second beam direction and said receiving the second wireless signal in the third beam direction concurrently and wherein the first and second wireless signals at least partially overlap in frequency, thereby enabling full duplex communication.

10. The non-reciprocal surface of claim 9, wherein the second beam direction is toward a first reflecting surface.

11. The non-reciprocal surface of claim 10, wherein the first reflecting surface is a first non-reciprocal reflecting surface.

12. The non-reciprocal surface of claim 10, wherein the third beam direction is toward a second reflecting surface.

13. The non-reciprocal surface of claim 12, wherein the second reflecting surface is a second non-reciprocal reflecting surface.

14. The non-reciprocal surface of claim 9, wherein:

receiving the first wireless signal from the base station comprises receiving the first wireless signal from at least one first antenna of the base station; and transmitting the second wireless signal toward the base station comprises transmitting the second wireless signal to at least one second antenna of the base station;

wherein the at least one first antenna is spatially separated from the at least one second antenna.

15. The non-reciprocal surface of claim 14, wherein the first beam direction and the fourth beam direction are substantially nonparallel.

16. The non-reciprocal surface of claim 9, wherein the non-reciprocal surface is a beam steerable metasurface.

17. An antenna array for transmitting and receiving wireless signals, comprising:

an input/output (I/O) port;

a plurality of antenna elements arranged in a two-dimensional grid;

each antenna element of the plurality of antenna elements being connected to the I/O port via a respective magnitude and phase adjustment (MPA) module;

a plurality of magnitude and phase adjustment (MPA) modules each connecting a respective one of the plurality of antenna elements to the I/O port, each one of the MPA modules comprising:

a transmit path comprising a first amplifier and a first phase shifter;

a receive path comprising a second amplifier and a second phase shifter;

a first circulator connected to the respective one of the plurality of antenna elements, the transmit path and the receive path for allowing transmissions from the respective one of the plurality of antenna elements to the receive path and transmissions from the transmit path to the respective one of the plurality of antenna elements; and a second circulator connected to the I/O port, the transmit path and the receive path for allowing transmissions from the I/O port to the transmit path and transmissions from the receive path to the I/O port, the first circulator and the second circulator allowing concurrent emission of a first signal and detection of a second signal both by the respective one of the plurality of antenna elements.

18. The antenna array of claim 17, wherein the first phase shifter is tunable to perform transmit beamforming of a signal to be transmitted by the plurality of antenna elements.

19. The antenna array of claim 17, wherein the second phase shifter is tunable to perform receive beamforming of a signal received by the plurality of antenna elements.

* * * * *